(12) United States Patent
Toyama et al.

(10) Patent No.: US 8,023,070 B2
(45) Date of Patent: *Sep. 20, 2011

(54) LED BACKLIGHT DEVICE AND LCD DEVICE

(75) Inventors: Hiroshi Toyama, Tokyo (JP); Yukio Nakamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 12/318,117

(22) Filed: Dec. 22, 2008

(65) Prior Publication Data

US 2009/0161038 A1    Jun. 25, 2009

(30) Foreign Application Priority Data

Dec. 25, 2007  (JP) .................................. 2007-331297

(51) Int. Cl.
*G02F 1/13357* (2006.01)
*H01L 33/00* (2010.01)
(52) U.S. Cl. .......................................... 349/69; 257/79
(58) Field of Classification Search .............. 349/58–62, 349/119, 139, 68, 69, 71; 257/79; 313/499; 362/97.3
See application file for complete search history.

(56) References Cited

U.S. PATENT DOCUMENTS

| 7,006,172 | B2 * | 2/2006 | Kawana et al. | 349/71 |
| 7,863,614 | B2 * | 1/2011 | Toyama et al. | 257/59 |
| 7,884,371 | B2 * | 2/2011 | Toyama et al. | 257/72 |
| 7,884,374 | B2 * | 2/2011 | Toyama et al. | 257/79 |

FOREIGN PATENT DOCUMENTS

JP          11-232920          8/1999

* cited by examiner

*Primary Examiner* — Akm E Ullah
(74) *Attorney, Agent, or Firm* — Rabin & Berdo, PC

(57) ABSTRACT

A backlight device includes a first substrate having optical transparency and having first and second surfaces opposite to each other. An LED thin-film is fixed to the first surface of the first substrate. An anode electrode and a cathode electrode are formed on the LED thin-film. An anode driver IC and a cathode driver IC are provided for driving the LED thin-film to emit light. An anode wiring and a cathode wiring are provided on the first surface of the first substrate. A second substrate has optical transparency, and has first and second surfaces opposite to each other. The second surface of the second substrate faces the first surface of the first substrate. A reflection film is provided on the first surface of the second substrate. A light diffusion plate is provided so as to face the second surface of the first substrate and has a function to diffuse incident light.

24 Claims, 23 Drawing Sheets

LED BACKLIGHT DEVICE AND LCD DEVICE

BACKGROUND OF THE INVENTION

The present invention relates to an LED backlight device and an LCD device using the LED backlight device.

In a general LCD (Liquid Crystal Display) device, an LCD panel is irradiated with light emitted by a light source. By changing molecular alignments of liquid crystals (pixels) arranged on the LCD panel, an image is displayed using the light passing through the LCD panel.

The light source used in such an LCD device is called as a backlight, since the light source is disposed on the backside of the LCD panel (i.e., the side opposite to a display surface of the LCD panel). The conventional light source is composed of a cold cathode ray tube or a semiconductor light emitting element. The light source using the semiconductor light emitting element has been broadly used, since such a light source has a long lifetime and contributes to reduction of power consumption.

In this regard, there is known a surface-emitting light source that uses an LED (Light Emitting Diode) as the above described semiconductor light emitting element. Such a surface-emitting light source has a plate-like member called as a light guiding plate or a light diffusion plate for guiding the light emitted by the LED. The light emitted by the LED is incident on an end surface of the light guiding plate. The light guiding plate reflects and diffuses the incident light in the direction perpendicular to the surface of the light guiding plate, and emits the light from a surface thereof (see Patent Document No. 1).

Patent Document No. 1: Japanese Laid-Open Patent Publication No. 11-232920.

SUMMARY OF THE INVENTION

The present invention is intended to provide a thin LED backlight device capable of providing a high light intensity, and an LCD device using such an LED backlight.

The present invention provides a backlight device including a first substrate having optical transparency, and having a first surface and a second surface opposite to each other. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film to emit light. An anode wiring is formed on the first surface of the first substrate to electrically connect the anode driver IC and the anode electrode of the LED thin-film. A cathode wiring is formed on the first surface of the first substrate to electrically connect the cathode driver IC and the cathode electrode of the LED thin-film. A second substrate has optical transparency and has a first surface and a second surface opposite to each other. The second surface of the second substrate faces the first surface of the first substrate. A reflection film is formed on the first surface of the second substrate. A light diffusion plate is provided so as to face the second surface of the first substrate and has a function to diffuse incident light.

Since the LED thin-film is fixed to the first surface of the first substrate having optical transparency, and the reflection film is fixed to the first surface of the second substrate (having optical transparency) whose second surface faces the first surface of the first substrate, the thickness of the LED backlight device can be reduced, and the amount of light emission can be increased. Therefore, a thin and high-intensity LED backlight device can be obtained.

The present invention also provides an LED backlight device including a first substrate having optical transparency and having a first surface and a second surface opposite to each other. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film to emit light. An anode wiring is formed on the first surface of the first substrate to electrically connect the anode driver IC and the anode electrode of the LED thin-film. A cathode wiring is formed on the first surface of the first substrate to electrically connect the cathode driver IC and the cathode electrode of the LED thin-film. A second substrate has a first surface and a second surface opposite to each other. The first surface of the second substrate faces the first surface of the first substrate. A protrusion is formed on the first surface of the second substrate. The protrusion has an inclined surface and faces a portion on the first surface of the first substrate apart from the LED thin-film by a predetermined distance. A reflection film is formed on the first surface of the second substrate. A light diffusion plate is provided so as to face the second surface of the first substrate, and has a function to diffuse incident light.

The present invention also provides a first substrate having optical transparency and has a first surface and a second surface opposite to each other. An LED thin-film is fixed to the first surface of the first substrate. The LED thin-film is formed of epitaxially grown inorganic material layers as a P-N junction device. An anode electrode and a cathode electrode are formed on the LED thin-film. An anode driver IC and a cathode driver IC are provided for driving the LED thin-film to emit light. An anode wiring is formed on the first surface of the first substrate to electrically connect the anode driver IC and the anode electrode of the LED thin-film. A cathode wiring is formed on the first surface of the first substrate to electrically connect the cathode driver IC and the cathode electrode of the LED thin-film. A protrusion is formed on the first surface of the first substrate. The protrusion has an inclined surface and is disposed apart from the LED thin-film by a predetermined distance. A second substrate has optical transparency, and has a first surface and a second surface opposite to each other. The second surface of the second substrate faces the first surface of the first substrate. A reflection film is formed on the first surface of the second substrate. A light diffusion plate is provided so as to face the second surface of the first substrate, and has a function to diffuse incident light.

The present invention also provides an image forming apparatus including the above described LED backlight device and an LCD panel provided so as to face the LED backlight device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, embodiments of the present invention will be described with reference to the attached drawings.

First Embodiment

Figure 1:
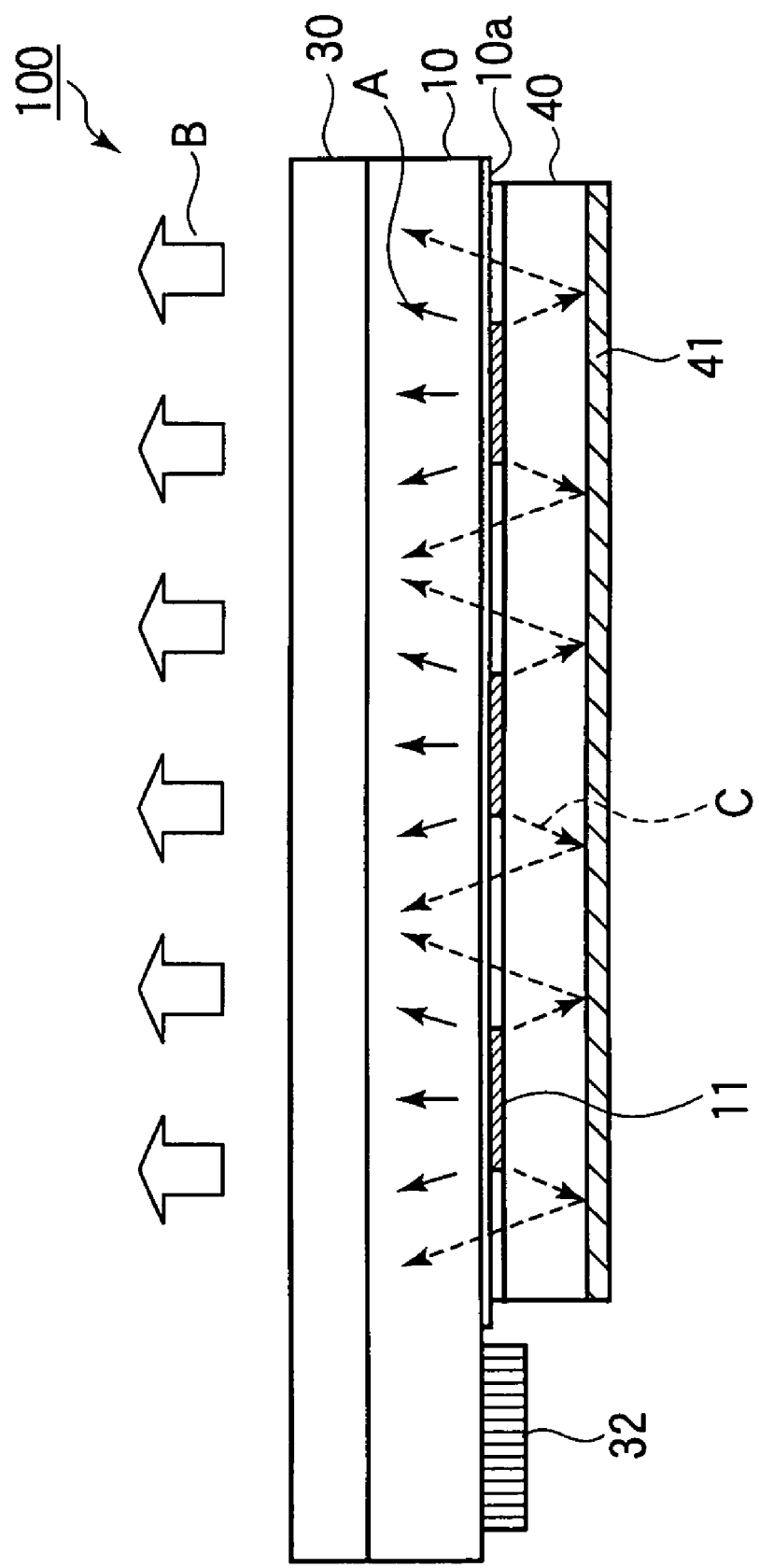
FIG. 1 is a side sectional view showing an LED backlight device according to the first embodiment of the present invention.
Figure 2:
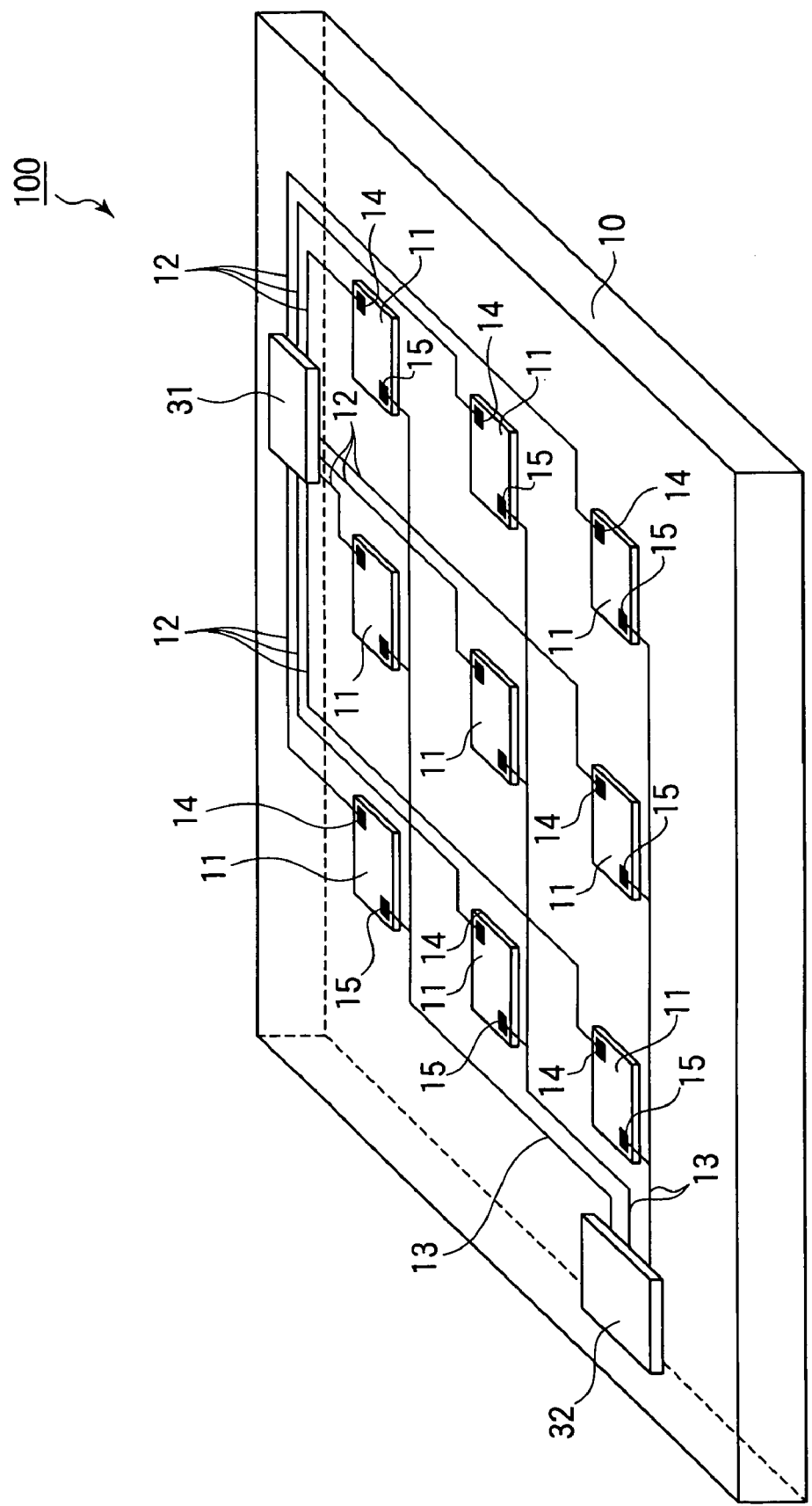
FIG. 2 is a perspective view showing an arrangement on a first surface of a first substrate according to the first embodiment of the present invention.
Figure 3:
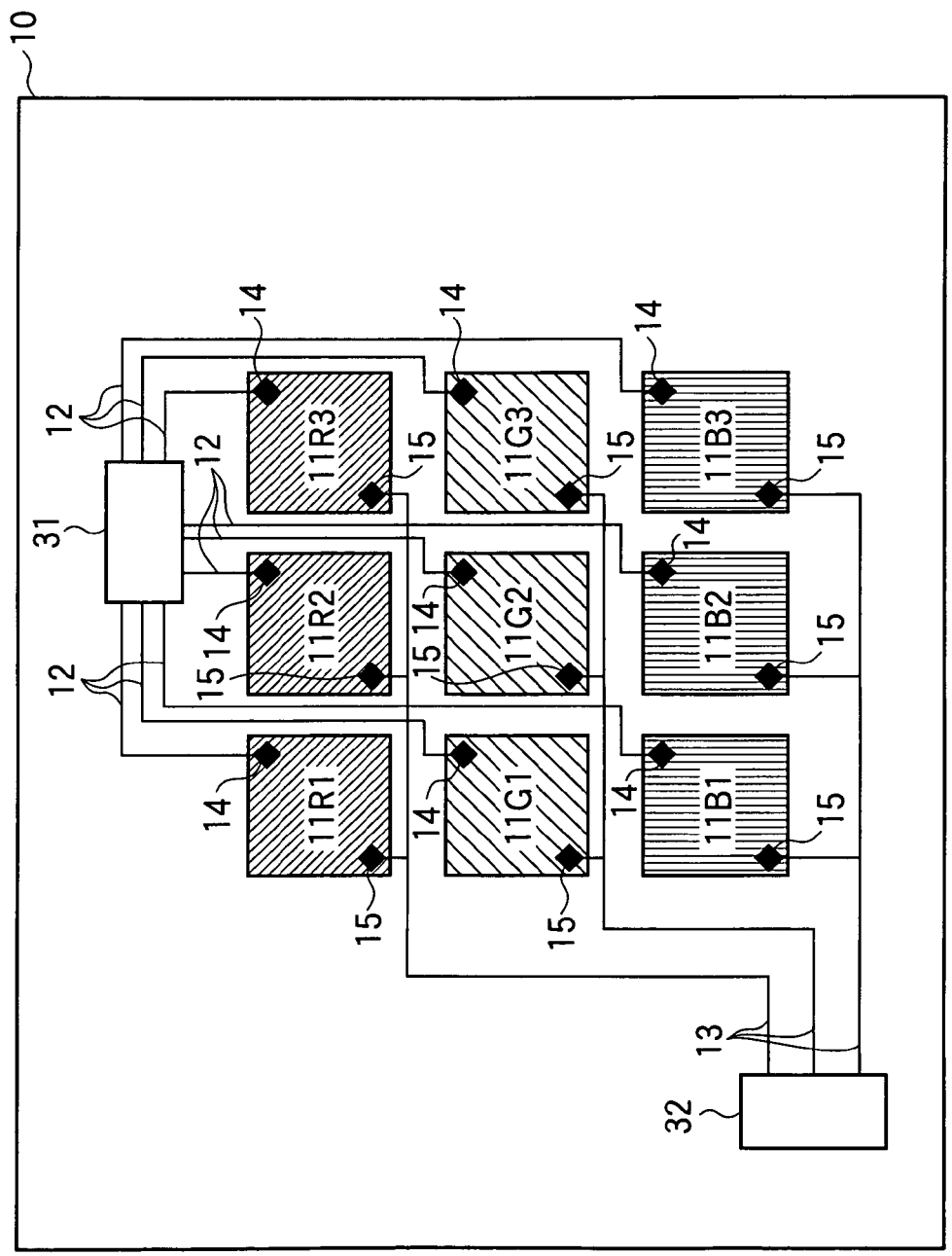
FIG. 3 is a plan view showing the arrangement on the first surface of the first substrate according to the first embodiment of the present invention.
Figure 4:
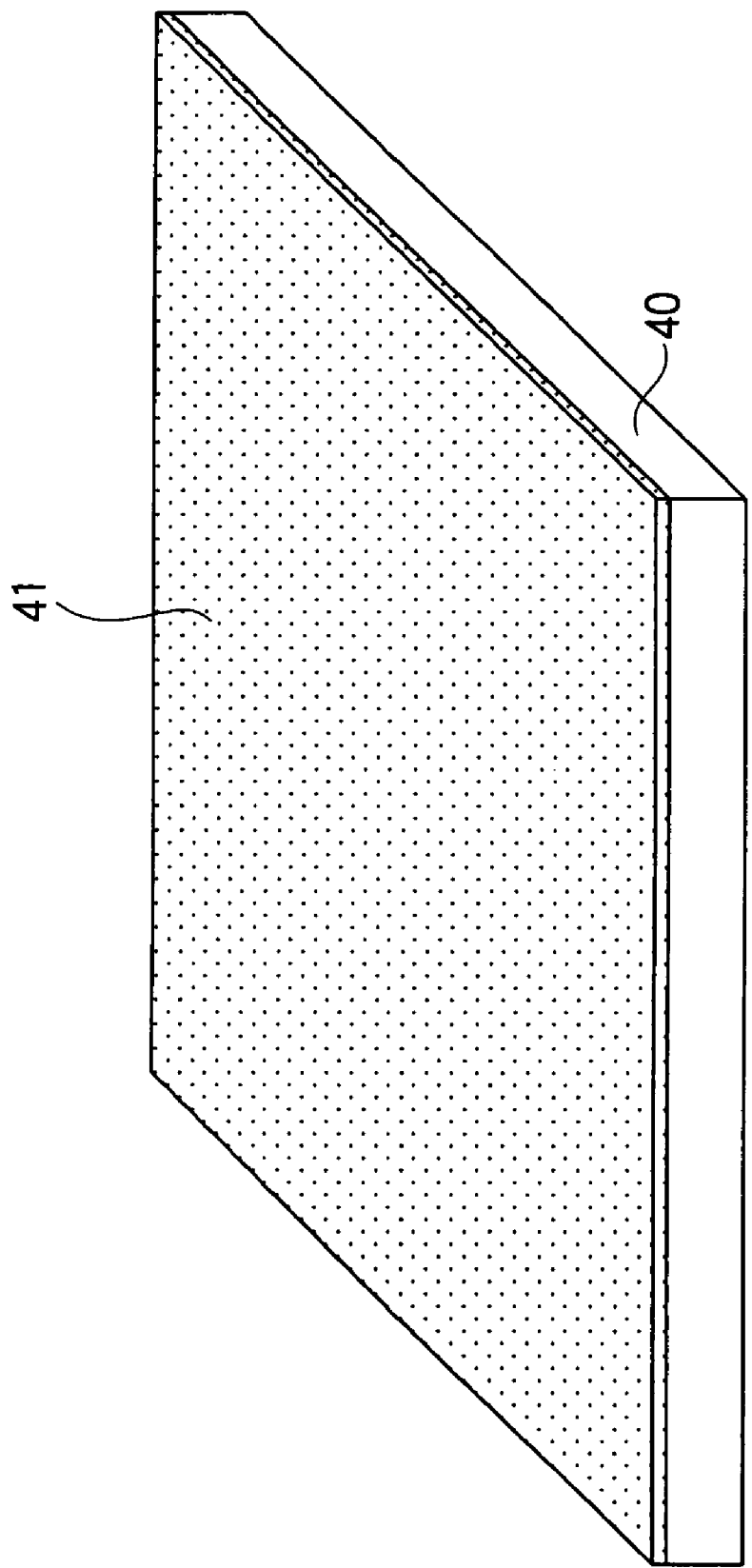
FIG. 4 is a perspective view showing a second substrate according to the first embodiment of the present invention, as seen from a first surface side thereof.
Figure 5:
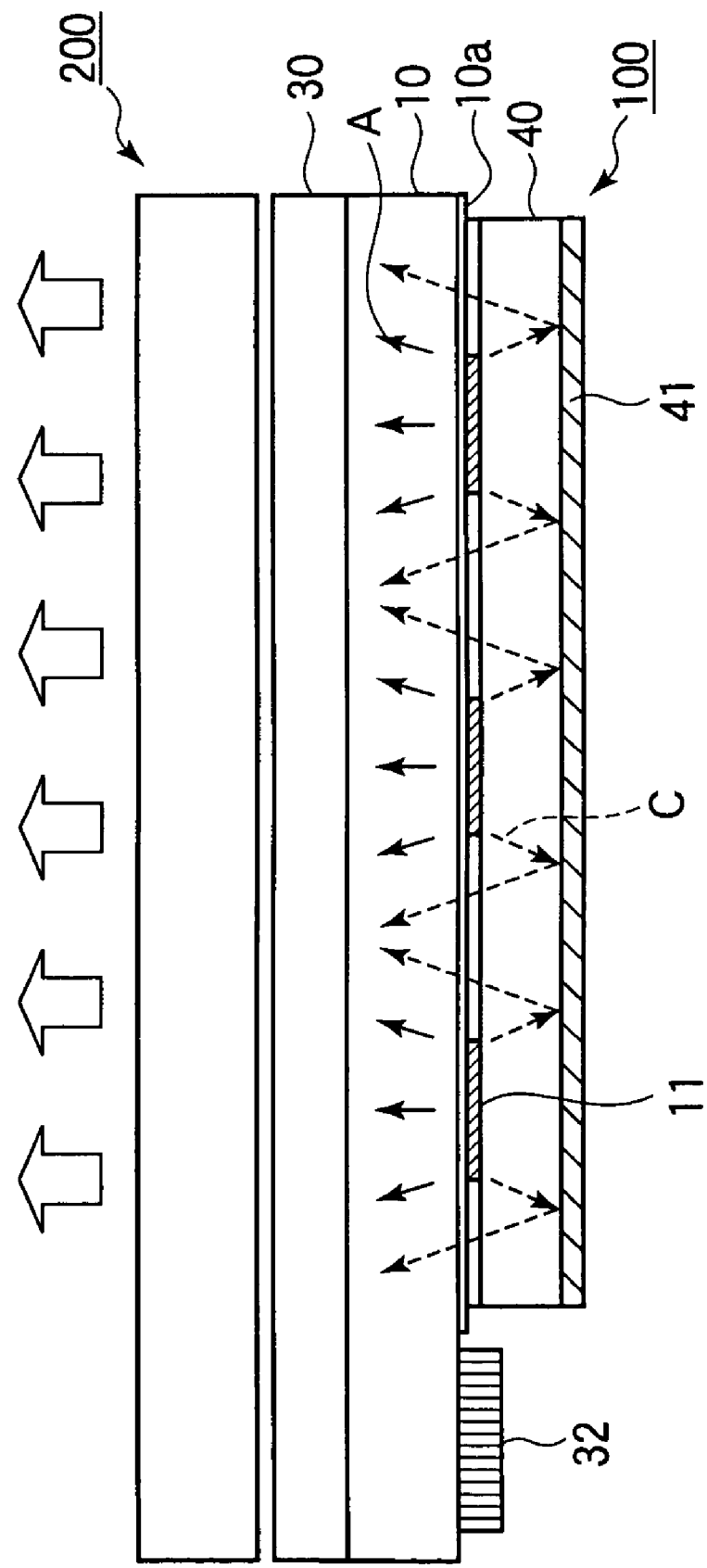
FIG. 5 is a side sectional view showing an LCD device using the LED backlight device according to the first embodiment of the present invention.

FIG. 1 is a side sectional view showing an LED backlight device according to the first embodiment of the present invention. FIG. 2 is a perspective view showing an arrangement on a first surface of a first substrate according to the first embodiment of the present invention. FIG. 3 is a plan view showing the arrangement on the first surface of the first substrate according to the first embodiment of the present invention. FIG. 4 is a perspective view showing a second substrate according to the first embodiment of the present invention, as seen from a first surface side thereof. FIG. 5 is a side sectional view showing an LCD device using the LED backlight device according to the first embodiment of the present invention.

As shown in FIG. 5, an LED backlight device 100 according to the first embodiment and an LCD panel 200 constitute an LCD device. The LED backlight device 100 is disposed on a backside of the LCD panel 200 (i.e., a side of the LCD panel 200 opposite to a display surface), and functions as a light source for illuminating the LCD panel 200. The LCD panel 200 is of a transmission type.

As shown in FIG. 1, the LED backlight device 100 includes a substrate 10 (i.e., a first substrate) in the form of a flat plate. The substrate 10 has a first surface (i.e., a lower surface in FIG. 1) and a second surface (i.e., an upper surface in FIG. 1) opposite to each other. LEDs 11 (i.e., LED thin-films) are fixed to the first surface of the substrate 10. A light diffusion plate 30 in the form of a flat plate is fixed to the second surface of the substrate 10. The LED backlight device 100 further includes a substrate 40 (i.e., a second substrate) in the form of a flat plate. The substrate 40 has a first surface (i.e., a lower surface in FIG. 1) and a second surface (i.e., an upper surface in FIG. 1) opposite to each other. The second surface of the substrate 40 faces the first surface of the substrate 10. A reflection film 41 is fixed on the first surface of the substrate 40 so as to entirely cover the first surface of the substrate 40.

The LEDs 11 are arranged on the first surface of the substrate 10 in an array as shown in FIGS. 2 and 3. The number and arranging manner of the LEDs 11 can be arbitrarily determined. Here, the LEDs 11 are arranged in a square grid of 3 rows and 3 columns at constant intervals for convenience of illustration. The LEDs 11 include three LEDs 11R that emit red light, three LEDs 11G that emit green light, and three LEDs 11B that emit blue light. In the grid, the LEDs 11 that emit light of the same color are arranged on the same row.

To be more specific, as shown in FIG. 3, the LEDs 11R1, 11R2 and 11R3 are arranged to form a first row. The LEDs 11G1, 11G2 and 11G3 are arranged to form a second row. The LEDs 11B1, 11B2 and 11B3 are arranged to form a third row. When the LEDs 11R, 11G and 11B are collectively explained, the LEDs 11R, 11G and 11B are simply referred to as LEDs 11.

As shown in FIG. 3, an anode driver IC 31 and a cathode driver IC 32 for driving the LED 11 are disposed on the first surface of the substrate 10. Anode wirings 12 are formed on the first surface of the substrate 10, and ends of the anode wirings 12 are connected to the anode driver IC 31. The anode wirings 12 are connected to respective anode electrodes 14 formed on the LEDs 11. Cathode wirings 13 are formed on the first surface of the substrate 10, and ends of the cathode wirings 13 are connected to the cathode driver IC 32. The cathode wiring 13 are connected to respective cathode electrodes 15 formed on the LEDs 11. The cathode electrodes 15 of the LEDs 11 of the same row (i.e., the LEDs 11 that emit light of the same color) are connected to the same cathode wiring 13.

The substrate 10 is preferably composed of, for example, a quartz or glass substrate having optical transparency, or a resin substrate composed of acryl or the like having optical transparency. The reflection film 41 is composed of a metal film (such as aluminum film) or a layered reflection film that reflects visible light, and is formed by vacuum deposition, plating method or the like.

The substrate 10 has a surface layer (denoted by a numeral 10a in FIG. 1) composed of an organic insulation film (such as polyimide film) or an inorganic insulation film, which forms the first surface. The surface layer 10a is planarized so that the surface accuracy is several tens of nanometers or less. The LEDs 11 are peeled off from another substrate as described later, and are fixed to the substrate 10 by means of intermolecular force such as hydrogen bonding so as to be integrated with the substrate 10.

The LED 11R (that emits red light) is composed of a layered thin-film having heterostructure or double heterostructure formed by epitaxially growing inorganic material such as aluminum gallium arsenide, aluminum gallium indium arsenide or the like. The LED 11R is not limited to these materials, but can be composed of any kind of material that emits light having the wavelength in a range from 620 nm to 710 nm. The LED 11G (that emits green light) is composed of a layered thin-film having heterostructure or double heterostructure formed by epitaxially growing inorganic material such as aluminum gallium indium phosphide, gallium phosphide or the like. The LED 11G is not limited to these materials, but can be composed of any kind of material that emits light having the wavelength in a range from 500 nm to 580 nm. The LED 11B (that emits blue light) is composed of a layered thin-film having heterostructure or double heterostructure formed by epitaxially growing inorganic material such as gallium nitride, gallium indium nitride or the like. The LED 11B is not limited to these materials, but can be composed of any kind of material that emits light having the wavelength in a range from 450 nm to 500 nm.

The light diffusion plate 30 is formed of a plastic substrate having optical transparency, and has a function to uniformly diffuse incident light. To be more specific, the light diffusion plate 30 is composed of polymer material such as polycarbonate or polyethylene terephthalate.

As described above, the substrates 10 and 40 are disposed so that the first surface of the substrate 10 faces the second surface of the substrate 40. The light diffusion plate 30 is disposed facing the second surface of the substrate 10. The reflection film 41 is disposed on the first surface of the substrate 40.

With such a configuration, the light diffusion plate 30 and the reflection film 41 are disposed on both sides with respect to the LEDs 11 via the substrates 10 and 40. Therefore, as shown in FIG. 1, lights emitted by the LEDs 11 toward the substrate 10 are incident on the light diffusion plate 30 as shown by arrows A. Lights emitted by the LEDs 11 toward the substrate 40 are reflected by the reflection film 41 and incident on the light diffusion plate 30 as shown by arrows C.

Therefore, when the respective LEDs 11 emit lights from both surfaces (i.e., upper and lower surfaces in FIG. 1), the light diffusion plate 30 facing the LEDs 11 and the reflection film 41 is irradiated with the lights from the LEDs 11 and the reflected lights from the reflection film 41. The light diffusion plate 30 uniformly diffuses incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by arrows B in FIG. 1.

The anode electrodes 14 and the cathode electrodes 15 are metal electrodes composed of gold, aluminum, or layered metal electrodes composed of gold or aluminum layered with nickel, titan or the like. The anode electrodes 14 and the cathode electrodes 15 are respectively connected to anodes and cathodes of the LEDs 11.

The anode wirings 12 and the cathode wirings 13 are metal wirings composed of gold, aluminum, or layered metal wirings composed of gold or aluminum layered with nickel, titan or the like. The anode wirings 12 and the cathode wirings 13 are respectively connected to the anode electrodes 14 and the cathode electrodes 15 of the LEDs 11. The ends of the anode wirings 12 are connected to the anode driver IC 31, and the ends of the cathode wirings 13 are connected to the cathode driver IC 32, so that the anode electrodes 14 and the cathode electrodes 15 of the LEDs 11 are connected to the anode driver IC 31 and the cathode driver IC 32 via the anode wirings 12 and the cathode wirings 13.

The anode driver IC 31 has a function to supply electric current to the LEDs 11 according to a lighting signal. The anode driver IC 31 includes circuits such as a shift register circuit, a latch circuit, a constant current circuit or an amplifier circuit. The anode wirings 12 are connected to the anode electrodes 14 of the LEDs 11 and are also connected to driving elements of the anode driver IC 31. Although the anode driver IC 31 is provided on the substrate 10 in the example shown in FIGS. 2 and 3, the anode driver IC 31 is not necessarily provided on the substrate 10, but can be provided on other print circuit board (not shown) or the like.

The cathode driver IC 32 has a function to allow electric current to flow therein from the LEDs 11. The cathode driver IC 32 includes switching circuits such as a transistor. The cathode wirings 13 are connected to the cathode electrodes 15 of the LEDs 11 and are also connected to the cathode driver IC 32. Although the cathode driver IC 32 is provided on the substrate 10 in the example shown in FIGS. 2 and 3, the cathode driver IC 32 is not necessarily provided on the substrate 10, but can be provided on other print circuit board (not shown) or the like.

The wiring pattern for the LEDs 11 is not limited to that shown in FIGS. 2 and 3, but can be suitably modified. Here, a modification of the wiring pattern will be briefly described.

Figure 6:
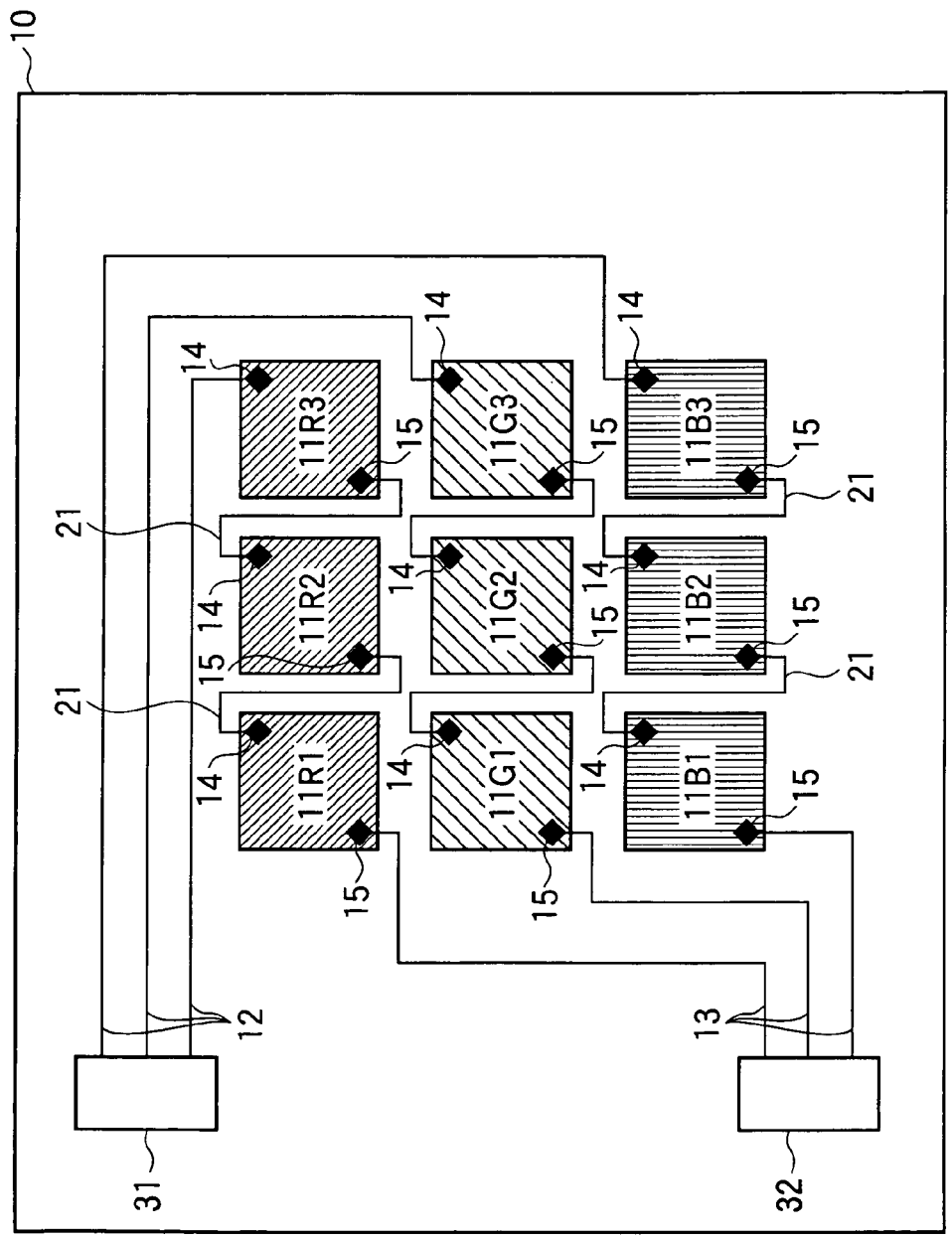
FIG. 6 is a schematic view showing a modification of a wiring pattern of the LED backlight device according to the first embodiment of the present invention, as seen from the first surface side thereof.

FIG. 6 is a schematic view showing a modification of the wiring pattern on the first surface of the first substrate of the LED backlight device according to the first embodiment of the present invention.

The anode driver IC 31 and the cathode driver IC 32 are provided on the first surface of the substrate 10 for driving the LEDs 11.

The anode wirings 12 (each of which has an end connected to the anode driver IC 31) are connected to the anode electrodes 14 of the LEDs 11 of the farthest column from the anode driver IC 31. The cathode wirings 13 (each of which has an end connected to the cathode driver IC 32) are connected to the cathode electrodes 15 of the LEDs 11 of the closest column to the anode driver IC 31. Further, in each row, the anode electrode 14 and the cathode electrode 15 of the adjacent LEDs 11 are connected to each other by interconnection wirings 21. In other words, the LEDs 11 of each row are electrically connected in series via the interconnection wirings 21, and the anode electrode 14 and the cathode electrode 15 of the endmost LEDs 11 of each row are connected to the anode driver IC 31 and the cathode driver IC 32 via the anode wirings 12 and the cathode wirings 13.

Next, a process for providing the LEDs 11 on the substrate 10 will be described.

Figure 7:
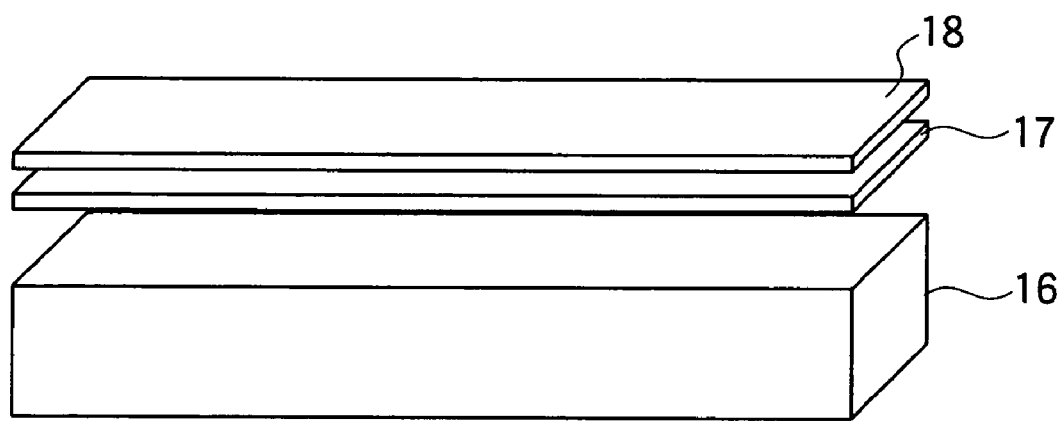
FIG. 7 is a schematic view showing a process for peeling an LED thin-film according to the first embodiment of the present invention.
Figure 8:
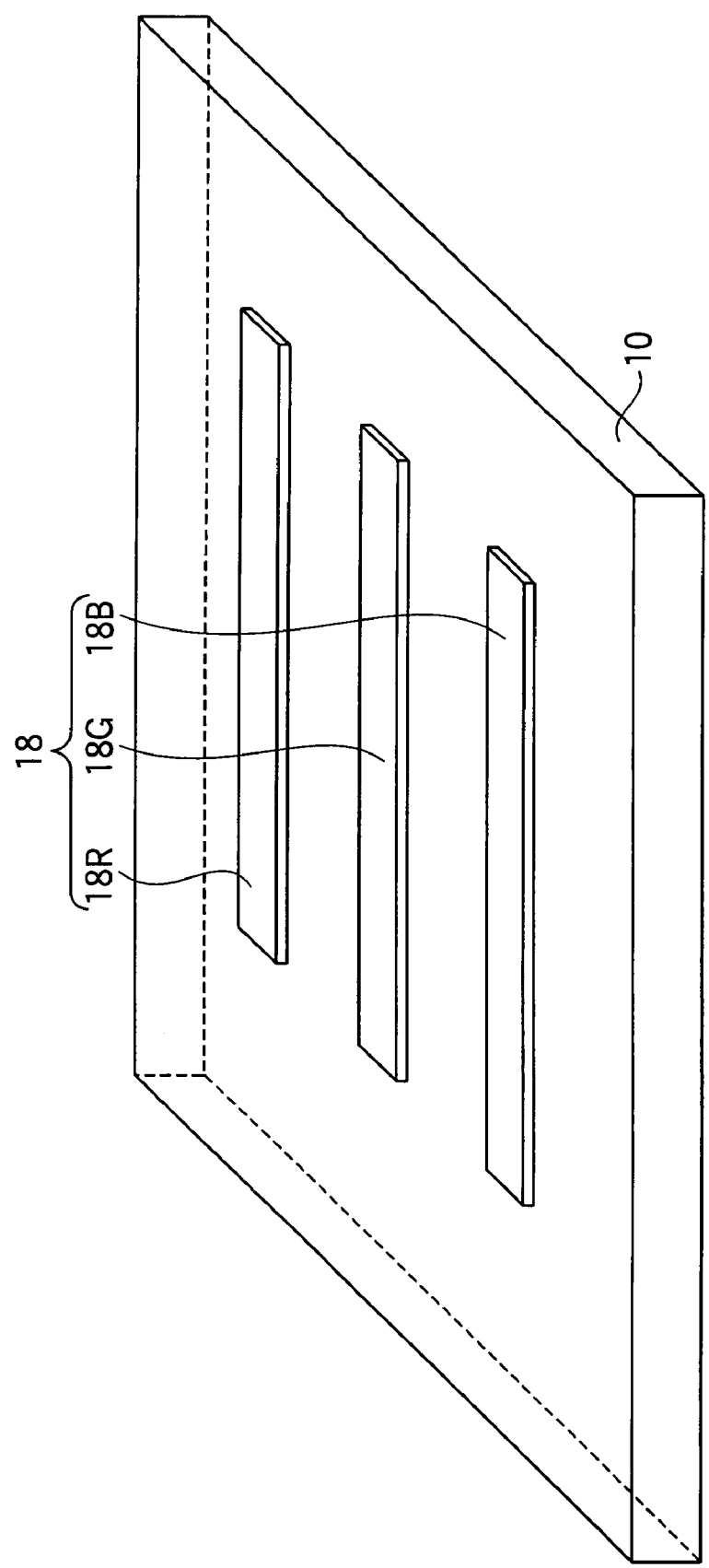
FIG. 8 is a schematic view showing a process for fixing the LED thin-film to the first substrate according to the first embodiment of the present invention.
Figure 9:
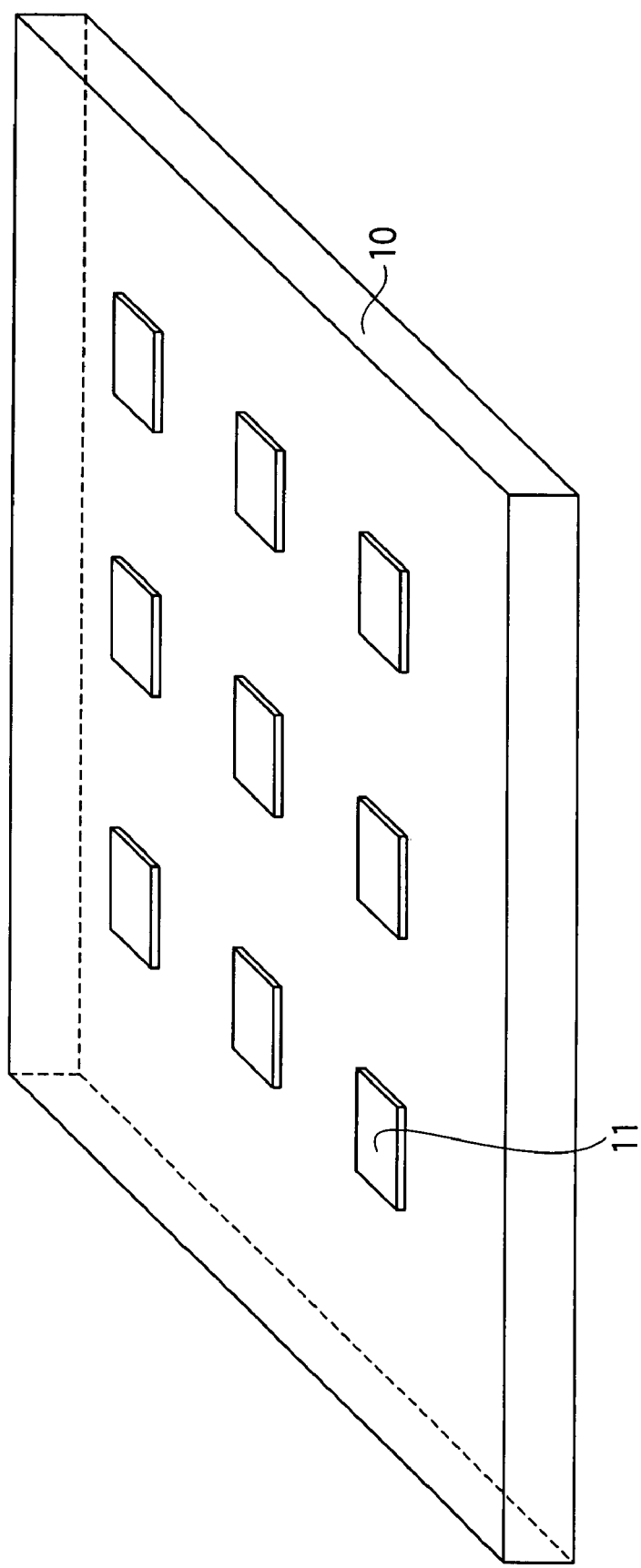
FIG. 9 is a schematic view showing a process for dividing the LED thin-film into the LEDs according to the first embodiment of the present invention.

FIG. 7 shows a process for peeling an LED thin-film (for forming the LED 11) according to the first embodiment of the present invention. FIG. 8 shows a process for fixing the LED thin-film to the substrate 10 according to the first embodiment of the present invention. FIG. 9 is a schematic view showing a process for dividing the LED thin-film into the LEDs 11 according to the first embodiment of the present invention.

As shown in FIG. 7, an LED thin-film 18 for forming the LED 11 is in the form of an elongated band or a strip. The LED thin-film 18 is fixed to the substrate 10, and is divided into a plurality of LEDs 11 as described later.

The LED thin-film 18R for forming the LED 11R (that emits red light) is a layered thin-film having heterostructure or double heterostructure composed of a plurality of layers such as aluminum gallium arsenide, aluminum gallium indium arsenide or the like. The LED thin-film 18G for forming the LED 11G (that emits green light) is a layered thin-film having heterostructure or double heterostructure composed of a plurality of layers such as aluminum gallium indium phosphide, gallium phosphide or the like. The LED thin-film 18B for forming the LED 11B (that emits blue light) is a layered thin-film having heterostructure or double heterostructure composed of a plurality of layers such as gallium nitride, gallium indium nitride or the like.

A sacrificial layer 17 is provided between a base material 16 and the LED thin-film 18 for peeling (i.e., separating) the LED thin-film 18 from the base material 16. The sacrificial layer 17 is composed of material such as, for example, aluminum arsenide that can easily be etched by an etching solution described later.

The base material 16 is composed of, for example, gallium arsenide, gallium nitride, sapphire or the like. Inorganic material layers forming the LED thin-film 18 are epitaxially grown on the base material 16 using a vapor-phase growth method such as an MOCVD method.

Next, a process for peeling the LED thin-film 18 from the base material 16 will be described.

If each LED 11 has, for example, a square shape having each side of 2 mm in length, the LED thin-film 18 is formed into a strip shape having a width wider than or equal to 2 mm and a length longer than or equal to a length of each column (including three LEDs 11). In this case, the LED thin-film 18 is formed into a strip shape using an etching solution such as a solution containing phosphoric acid, hydrogen peroxide and water ($H_3PO_4:H_2O_2:H_2O$) or the like, by means of a photolithographic etching technique broadly used in a semiconductor manufacturing process.

Then, the base material 16 on which the LED thin-film 18 is formed is immersed in an etching solution such as hydrogen fluoride solution, hydrochloric acid solution or the like. With this, the sacrificial surface 17 is etched (removed), and the LED thin-film 18 is peeled off from the base material 16.

Next, the LED thin-film 18 (having been peeled off from the base material 16) is pressed against the planarized surface of the substrate 10, and the substrate 10 and the LED thin-film 18 are fixed to each other by means of intermolecular force and integrated with each other.

The surface layer 10a (FIG. 1) of the substrate 10 is composed of an organic insulation film such as a polyimide film or an inorganic insulation film such as a silicon oxide film, and preferably has a flat surface whose surface accuracy is less than or equal to several tens of nanometers having no concaves or convexes. Since the surface of the substrate 10 is such a flat surface having no concave or convex, the bonding between the LED thin-film 18 and the substrate 10 by means of intermolecular force (such as hydrogen bonding or the like) can be easily achieved.

These processes are repeated, so that a plurality of columns (for example, three columns) of the LED thin-films 18R, 18G and 18B are fixed to the substrate 10 as shown in FIG. 8, and the LED thin-films 18R, 18G and 18B are integrated with the substrate 10.

Then, as shown in FIG. 9, the LED thin-film 18 fixed to the substrate 10 is divided into a plurality of LEDs 11 using an etching solution such as a solution containing phosphoric acid, hydrogen peroxide and water ($H_3PO_4:H_2O_2:H_2O$). In this embodiment, each LED thin-film 18 is divided into three LEDs 11.

With this, an LED array is formed on the first surface of the substrate 10, in which the LEDs 11 are arranged in a grid of three rows and three columns at constant intervals.

In this regard, the process for providing the LEDs 11 are not limited to those shown in FIGS. 7 through 9, but can be suitably modified. Here, a modification of the process for providing the LEDs 11 will be described.

Figure 10:
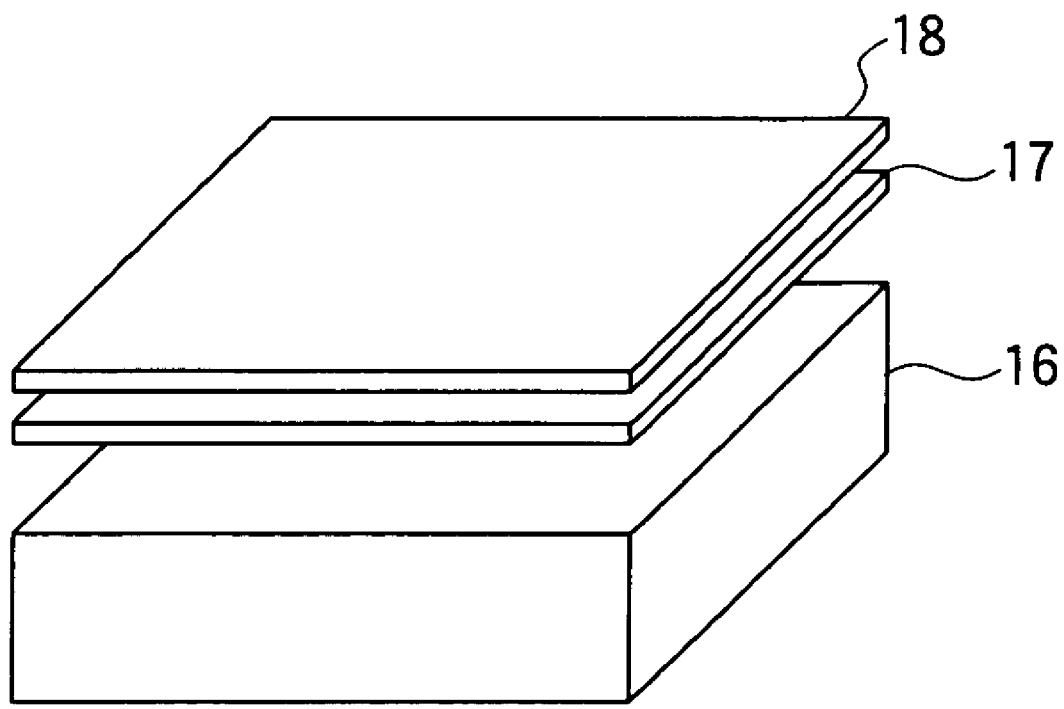
FIG. 10 is a schematic view showing a modification of the process for peeling the LED thin-film according to the first embodiment of the present invention.

FIG. 10 shows a modification of the process for peeling the LED thin-film 18 according to the first embodiment of the present invention.

In FIG. 10, the LED thin-film 18 is formed on the base material 16 via the sacrificial layer 17. In this modification, if each LED 11 has a square shape having each side of 2 mm in length, the LED thin-film 18 for forming the LED 11 has a square shape having each side longer than or equal to 2 mm. In other words, each LED thin-film 18 is formed to have shape and size substantially the same as the LED 11. The respective LED thin-films 18 are fixed to the first surface of the substrate 10 as described above, so that an LED array in which the LEDs 11 are arranged in a square grid of three rows and three columns as shown in FIG. 9 can be obtained. The other processes in this modification are the same as described with reference to FIGS. 7 through 9, and explanations thereof are omitted.

Next, a forming process of the electrodes and the wirings on the LED array will be described.

In this case, the anode electrode 14 and the cathode electrode 15 (connected to anodes and cathodes of the respective LEDs 11), the anode wirings 12 (connected to the anode electrodes 14), the cathode wirings 13 (connected to the cathode electrodes 15) and the interconnection wirings 21 are formed using a deposition, a photolithographic etching method or a lift-off method. Furthermore, the anode driver IC 31 and the cathode driver IC 32 are mounted on the substrate 10, and the anode wirings 12 and the cathode wirings 13 are respectively connected to the anode driver IC 31 and the cathode driver IC 32. With this, the anode electrodes 14 and the cathode electrodes 15 of the respective LEDs 11 are connected to the anode driver IC 31 and the cathode driver IC 32 via the anode wirings 12 and the cathode wirings 13.

The entire configuration of the LED backlight device 100 is not limited to that shown in FIG. 1, but can be suitably modified. Here, a modification of the entire configuration of the LED backlight device 100 according to the first embodiment will be described.

Figure 11:
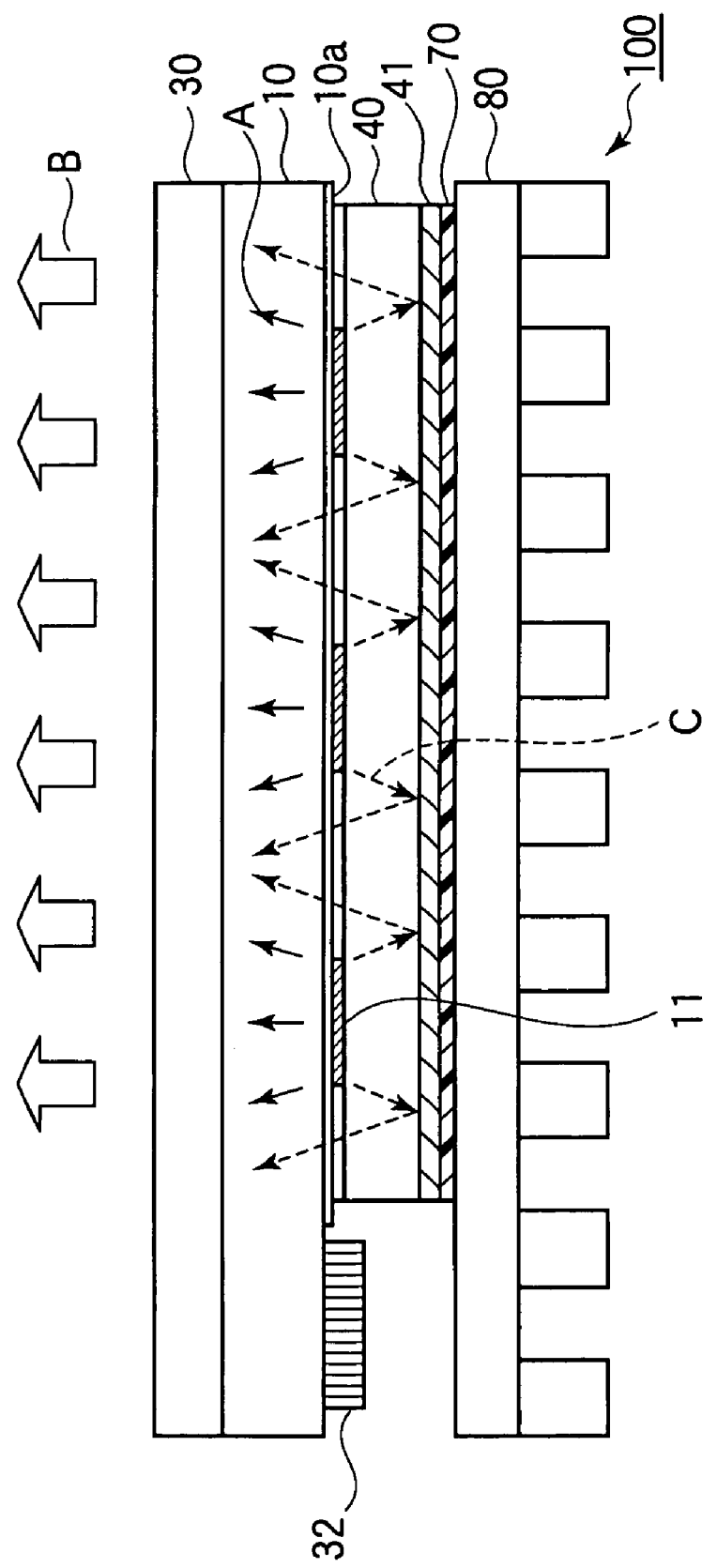
FIG. 11 is a side sectional view showing a modification of the LED backlight device according to the first embodiment of the present invention.
Figure 12:
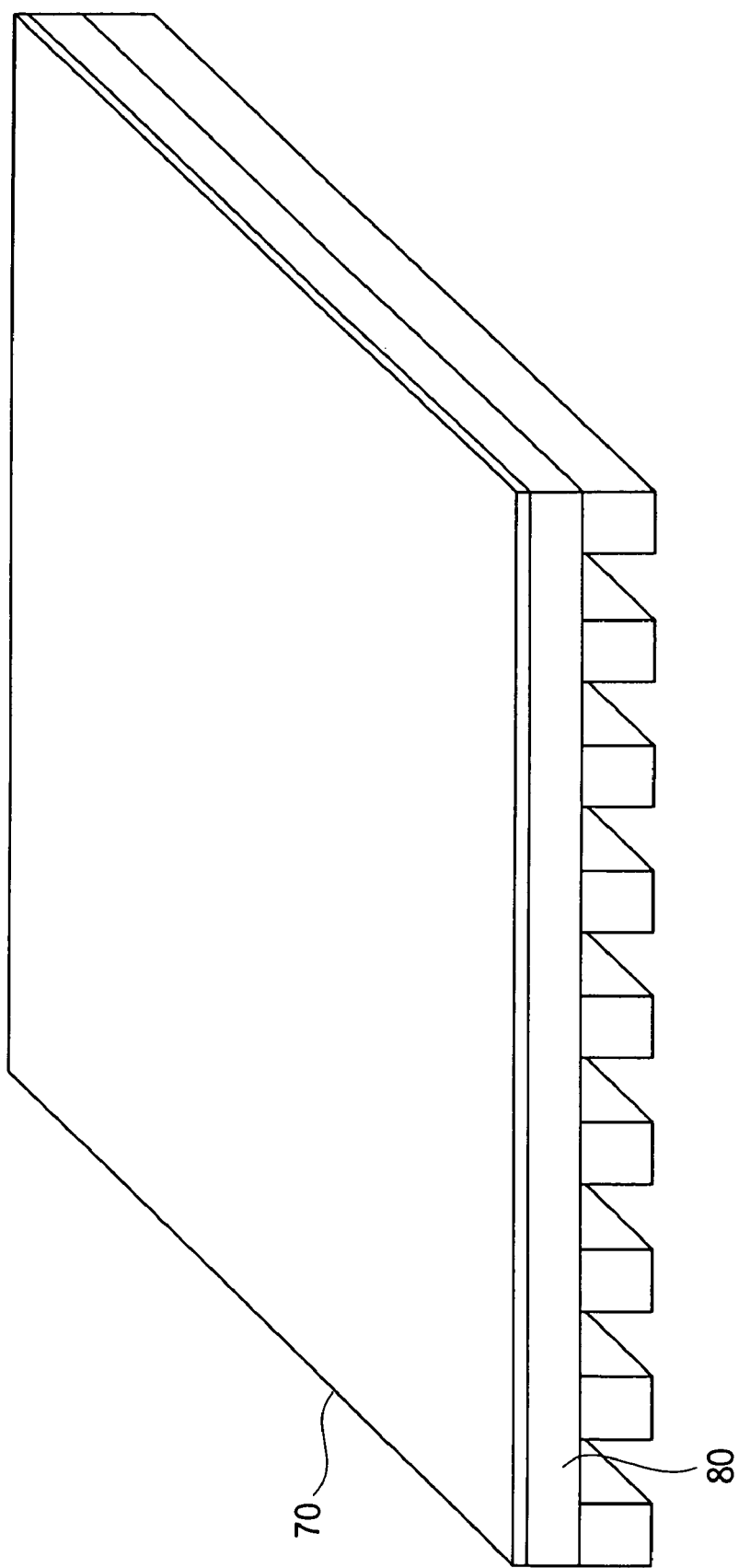
FIG. 12 is a side sectional view showing a modification of a heat releasing plate of the LED backlight device according to the first embodiment of the present invention.

FIG. 11 is a side sectional view showing a modification of the LED backlight device according to the first embodiment of the present invention. FIG. 12 is a side sectional view showing a modification of a heat releasing plate of the LED backlight device according to the first embodiment of the present invention.

In the modification shown in FIG. 11, a heat releasing plate 80 is bonded to the reflection film 41 (fixed to the first surface of the substrate 40) via a thermally-conductive adhesive agent 70. The heat releasing plate 80 is composed of a metal such as aluminum and has a shape as shown in FIG. 12. The thermally-conductive adhesive agent 70 is composed of silicone resin or the like having thermal conductivity, and is coated on a surface of the reflection film 41.

In this case, the heat generated by the emission of the LEDs 11 is diffused via the substrate 40, the reflection film 41, the thermally-conductive adhesive agent 70 and the heat releasing plate 80, and therefore the temperatures of the substrate 10 and the light diffusion plate 30 do not substantially increase.

Next, an operation of the LED backlight device 100 according to the first embodiment will be described. First, the operation in the case where the LEDs 11 are arranged as shown in FIG. 3 will be described.

A lighting signal is sent from a superior device (such as a not shown personal computer) and is inputted to the anode driver IC 31. Upon receiving the lighting signal, the amplifier circuit of the anode driver IC 31 applies constant currents to the anode electrodes 14 of the LEDs 11 via the anode wirings 12. When the lighting signal is inputted to the cathode driver IC 32, the cathode driver IC 32 operates to allow the currents to flow therein from the cathode electrodes 15 of the LEDs 11 of the respective rows through the cathode wirings 13 connected to the cathode driver IC 32 via the switching circuit having a large capacity.

With this, the LEDs 11 of the respective rows are applied with currents, and emit lights of red, green and blue.

As described above, the light diffusion plate 30 and the reflection film 41 are disposed on both sides with respect to the LEDs 11 via the substrates 10 and 40. Therefore, when the LEDs 11 emit lights, the lights emitted by the LEDs 11 toward the substrate 10 are directly incident on the light diffusion plate 30 as shown by the arrows A, and the lights emitted by the LEDs 11 toward the substrate 40 are reflected by the reflection film 41 and are incident on the light diffusion plate 30 as shown by the arrows C.

Therefore, the light diffusion plate 30 facing the LEDs 11 and the reflection film 41 is irradiated with the light from the LEDs 11 and the reflected lights from the reflection film 41. The light diffusion plate 30 uniformly diffuses the incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by the arrows B.

The LCD panel 200 disposed facing the LED backlight device 100 are irradiated (from backside) with white light emitted by the light diffusion plate 30 as shown in FIG. 5.

In this regard, the substrates 10 and 40 can be fixed to each other by filling a material such as silicone-based resin having high optical transparency into between the first surface of the substrate 10 and the second surface of the substrate 40, defoaming the material, and drying the material.

Next, the operation in the case where the LEDs 11 are arranged as shown in FIG. 6 will be described.

A lighting signal is sent from a superior device (such as a not shown personal computer) and is inputted to the anode driver IC 31. Upon receiving the lighting signal, the amplifier circuit of the anode driver IC 31 applies constant currents to the anode electrodes 14 of the LEDs 11 of the farthest column from the anode driver IC 31 via the anode wirings 12.

When the lighting signal is inputted to the cathode driver IC 32, the cathode driver IC 32 operates to allow the currents to flow therein from the cathode electrodes 15 of the LEDs 11 of the closest column to the anode driver IC 31 through the cathode wirings 13 connected to the cathode driver IC 32 via the switching circuit having a large capacity.

With this, the LEDs 11 of each row (connected to each other in series by the interconnection wirings 21) are applied with current, and LEDs 11 of the respective rows emit lights of red, green and blue.

In this regard, the arrangement of the substrates 10 and 40 and the light diffusion plate 30 is the same as that in the case where the LEDs 11 are arranged as shown in FIG. 3, and explanation thereof is omitted. The light diffusion plate 30 emits white light as shown by the arrow B in a similar manner to the case where the LEDs 11 are arranged as shown in FIG. 3.

In this embodiment, an example where the LEDs 11 of each row are connected in series has been described. However, it is also possible to connect the LEDs 11 of each column in series, or to connect obliquely arranged LEDs 11 in series. Further, it is also possible to combine LEDs 11 connected in series in a row, column or oblique direction, or various other ways.

In the modification shown in FIG. 11, since the heat releasing plate 80 is bonded to the reflection film 41 of the substrate 40, the heat generated by the emission of red, green and blue lights by the LEDs 11 is diffused via the substrate 40, the reflection film 41, the thermally-conductive adhesive agent 70 and the heat releasing plate 80, and therefore the temperatures of the substrate 10 and the light diffusion plate 30 do not substantially increase.

As described above, according to the first embodiment, the LEDs 11, the anode wirings 12 and the cathode wirings 13 are formed on the substrate 10 (having transparency), and the LEDs 11 are connected to the anode wirings 12 and the cathode wirings 13 using the semiconductor process. Therefore, a thin and large LED backlight device can be obtained.

Further, the LEDs 11 can be formed to have desired shape and size, and can be disposed on desired positions on the surface of the substrate 10. Moreover, the light diffusion plate 30 and the reflection film 41 are disposed on both sides with respect to the LEDs 11 via the substrates 10 and 40, and therefore the lights emitted from the both surfaces of the LEDs 11 can be used, with the result that the brightness can be increased. Further, variation in brightness and chromaticity can be restricted by adjusting the shapes and positions of the LEDs 11 and the thickness of the substrates 10 and 40.

Second Embodiment

Next, the second embodiment of the present invention will be described. Components of the second embodiment that are the same as those of the first embodiment are assigned the same reference numerals, and descriptions thereof are omitted. Further, descriptions of the operations and advantages that are same as those of the first embodiment are omitted.

Figure 13:
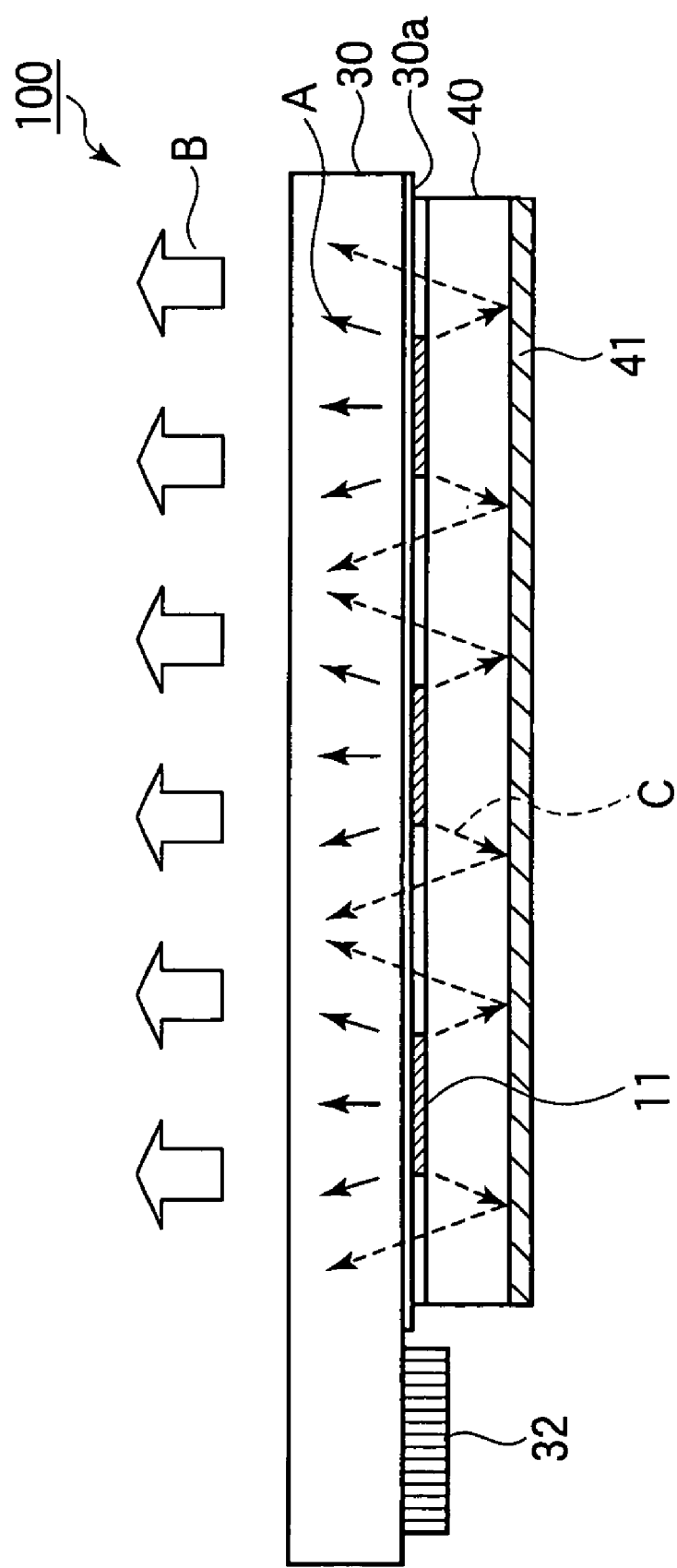
FIG. 13 is a side sectional view showing an LED backlight device according to the second embodiment of the present invention.

FIG. 13 is a side sectional view showing an LED backlight device according to the second embodiment of the present invention.

In the second embodiment, the LED backlight device 100 has the light diffusion plate 30 as a first substrate in the form of a flat plate. The light diffusion plate 30 has optical transparency and has a function to uniformly diffuse incident light, and is composed of polymer material such as polycarbonate or polyethylene terephthalate. The light diffusion plate 30 has a first surface (i.e., a lower surface in FIG. 13) and a second surface (i.e., an upper surface in FIG. 13) opposite to each other.

The LED backlight device 100 includes the LEDs 11 (i.e., LED thin-films) fixed to the first surface of the light diffusion plate 30. The LED backlight device 100 further includes the substrate 40 in the form of a flat plate as a second substrate, and the reflection film 41 formed so as to entirely cover a first surface (i.e., a lower surface in FIG. 13) of the substrate 40. The first surface of the light diffusion plate 30 faces a second surface (i.e., an upper surface in FIG. 13) of the substrate 40.

As was described in the first embodiment, the LEDs 11 include a plurality of LEDs 11R that emit red light, a plurality of LEDs 11G that emit green light, and a plurality of LEDs 11B that emit blue light. The anode driver IC 31 and the cathode driver IC 32 are disposed on the first surface of the light diffusion plate 30 for driving the LEDs 11. The anode wiring 12 (each of which has an end connected to the anode driver IC 31) are connected to the anode electrodes 14 of the LEDs 11. The cathode wiring 13 (each of which has an end connected to the cathode driver IC 32) are connected to the cathode electrodes 15 of the LEDs 11. The anode electrodes 15 of the LEDs 11 of each row (i.e., the LEDs 11 that emit lights of the same color) are connected to the same cathode 13.

The light diffusion plate 30 has a surface layer (denoted by a numeral 30a in FIG. 13) composed of an organic insulation film (such as polyimide film) or an inorganic insulation film, which forms the first surface. The surface layer 30a is planarized so that the surface accuracy is several tens of nanometers or less. The LEDs 11 are peeled off from another substrate as described later, and are fixed to the light diffusion plate 30 by means of intermolecular force such as hydrogen bonding so as to be integrated with the light diffusion plate 30.

As described above, the light diffusion plate 30 and the substrate 40 are disposed so that the first surface of the light diffusion plate 30 faces the second surface of the substrate 40.

Therefore, when the respective LEDs 11 emit lights from both surfaces (i.e., upper and lower surfaces in FIG. 13), the light diffusion plate 30 facing the LEDs 11 and the reflection film 41 is irradiated with the lights from the LEDs 11 and the reflected lights from the reflection film 41. The light diffusion plate 30 uniformly diffuses incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by arrows B in FIG. 13.

The other configurations of the LED backlight device 100 are the same as those of the first embodiment.

Next, an operation of the LED backlight device 100 according to the second embodiment will be described.

A lighting signal is sent from a superior device (such as a not shown personal computer) and is inputted to the anode driver IC 31. Upon receiving the lighting signal, the amplifier circuit of the anode driver IC 31 applies constant currents to the anode electrodes 14 of the LEDs 11 via the anode wirings 12. When the lighting signal is inputted to the cathode driver IC 32, the cathode driver IC 32 operates to allow the current to flow therein from the cathode electrodes 15 of the LEDs 11 of the respective rows through the cathode wirings 13 connected to the cathode driver IC 32 via the switching circuit having a large capacity.

With this, the LEDs 11 of the respective rows are applied with currents, and emit lights of red, green and blue.

As described above, when the LEDs 11 emit lights, the lights emitted by the LEDs 11 toward the light diffusion plate 30 are directly incident on the light diffusion plate 30 as shown by the arrows A, and the lights emitted by the LEDs 11 toward the substrate 40 are reflected by the reflection film 41 and are incident on the light diffusion plate 30 as shown by the arrows C.

Therefore, the light diffusion plate 30 facing the LEDs 11 and the reflection film 41 uniformly diffuses the lights from the LEDs 11 and the reflected lights from the reflection film 41, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by the arrows B.

In this regard, the light diffusion plate 30 and the substrate 40 can be fixed to each other by filling a material such as silicone-based resin having high optical transparency into the first surface of the light diffusion plate 30 and the second surface of the substrate 40, defoaming the material, and drying the material.

As described above, in the second embodiment, the LEDs 11 are provided directly on the light diffusion plate 30 having transparency, and the light diffusion plate 30 and the reflection film 41 are disposed on both sides with respect to the LEDs 11. Further, the LEDs 11, the anode wirings 12 and the cathode wirings 13 are formed on the light diffusion plate 30 (having transparency), and the LEDs 11 are connected to the anode wirings 12 and the cathode wirings 13 using the semiconductor process. Accordingly, a thinner and lighter LED backlight device 100 having simpler structure compared with the first embodiment can be obtained.

Third Embodiment

Next, the third embodiment of the present invention will be described. Components of the third embodiment that are the same as those of the first or second embodiment are assigned the same reference numerals, and descriptions thereof are omitted. Further, descriptions of the operations and advantages that are same as those of the first or second embodiment are omitted.

Figure 14:
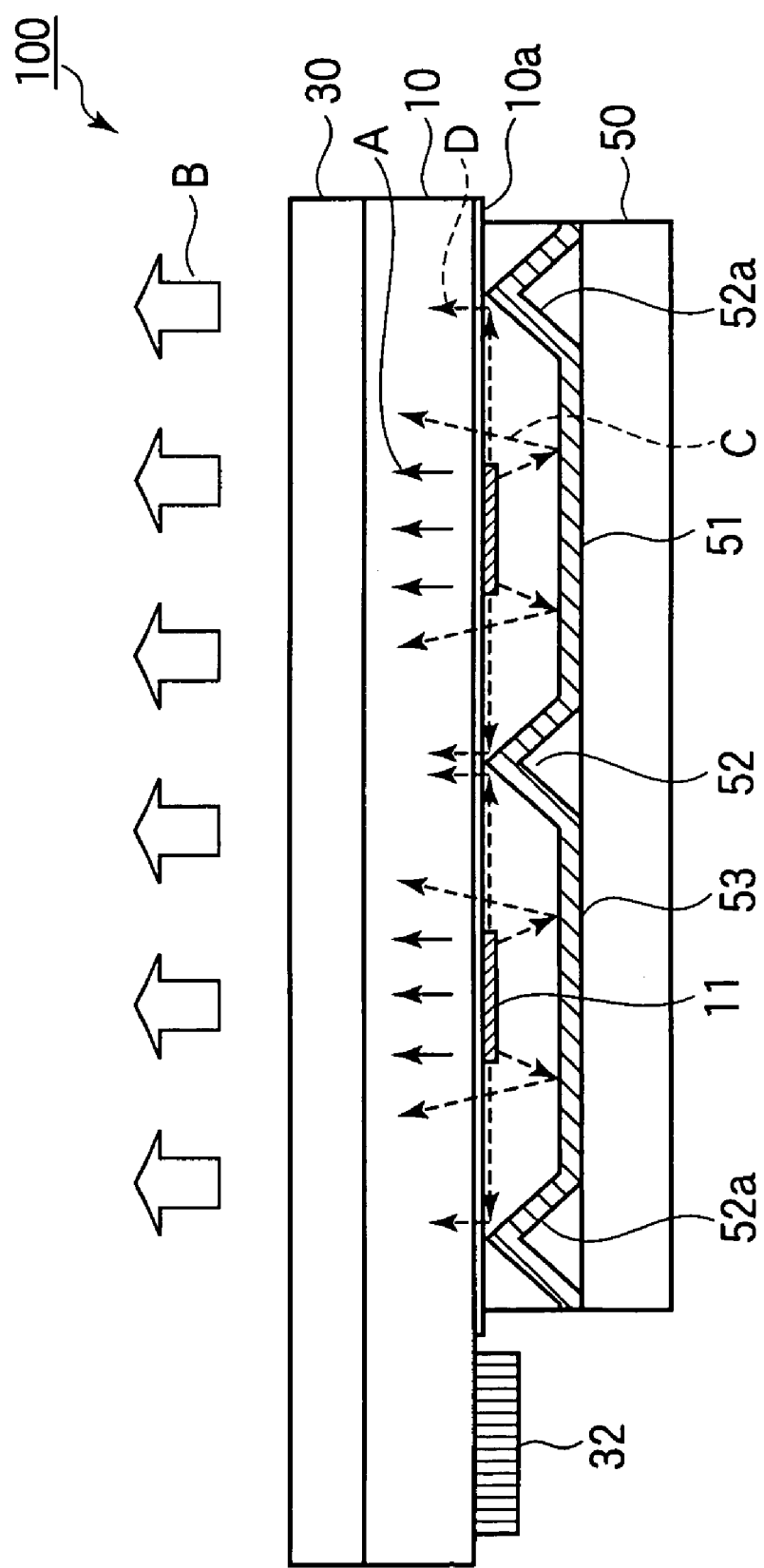
FIG. 14 is a side sectional view showing an LED backlight device according to the third embodiment of the present invention.
Figure 15:
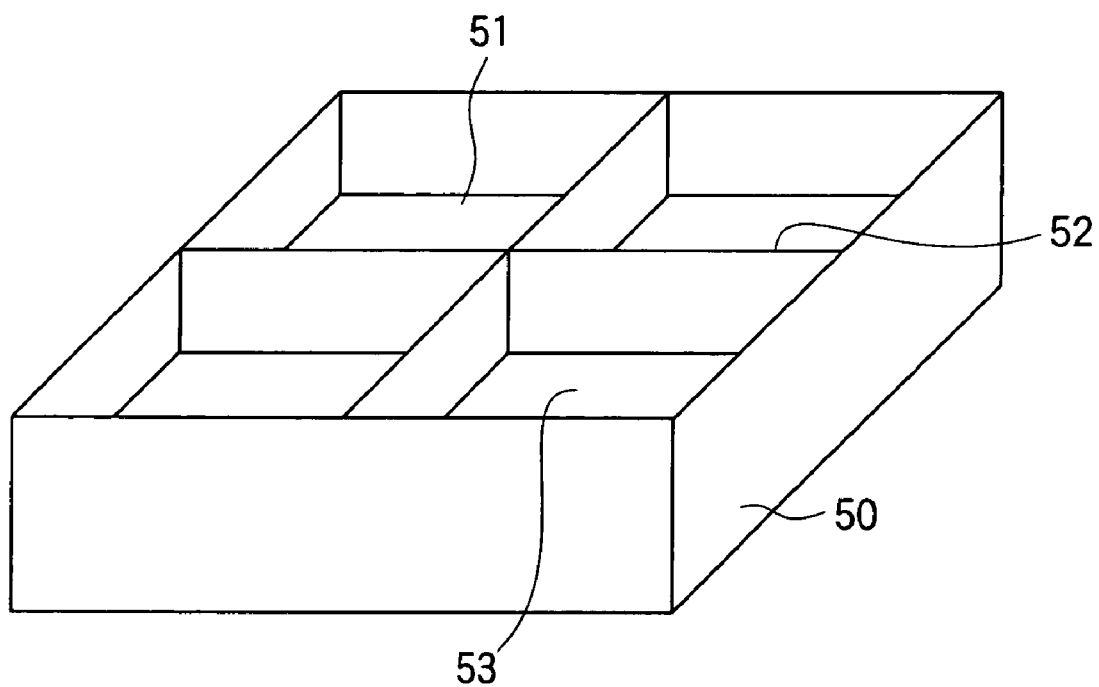
FIG. 15 is a perspective view showing a second substrate of the LED backlight device according to the third embodiment of the present invention, as seen from a first surface side thereof.
Figure 16:
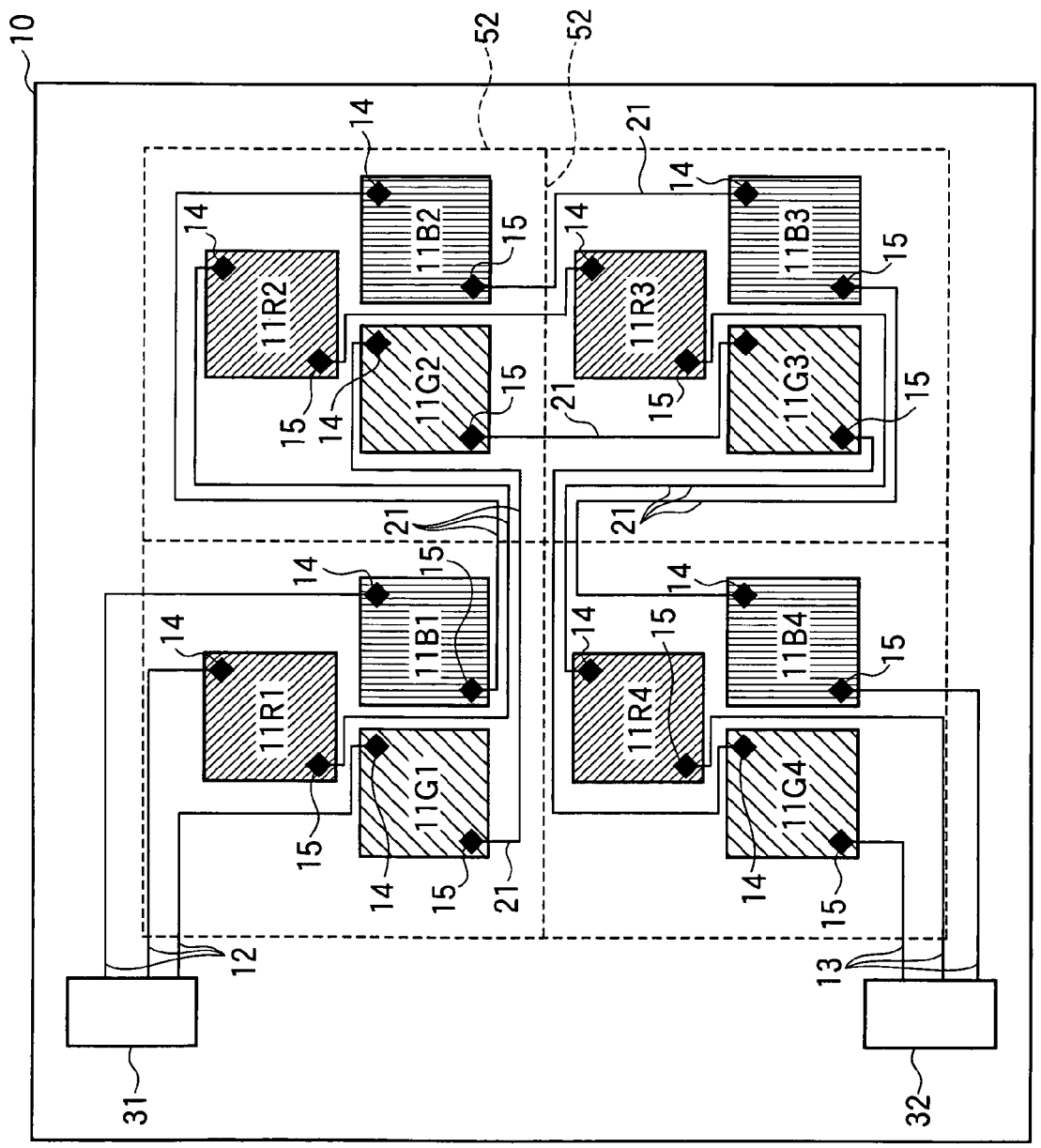
FIG. 16 is a plan view showing an arrangement on a first surface of a first substrate of the LED backlight device according to the third embodiment of the present invention.

FIG. 14 is a side sectional view showing an LED backlight device according to the third embodiment of the present invention. FIG. 15 is a perspective view showing a second substrate of the LED backlight device according to the third embodiment of the present invention, as seen from a first surface side thereof. FIG. 16 is a plan view showing an arrangement on a first surface of a first substrate of the LED backlight device according to the third embodiment of the present invention.

In the third embodiment, the LED backlight device 100 includes the substrate 10 (i.e., a first substrate) in the form of a flat plate, a substrate 50 (i.e., a second substrate) in the form of a flat plate and the light diffusion plate 30. The first surface (i.e., a lower surface in FIG. 14) of the substrate 10 faces the first surface (i.e., an upper surface in FIG. 14) of the substrate 50. The second surface (i.e., an upper surface in FIG. 14) of the substrate 10 faces the light diffusion plate 30.

The LEDs 11 are arranged on the first surface of the substrate 10, and include a plurality of groups of LEDs 11. Each group includes the LED 11R (that emits red light), the LED 11G (that emits green light) and the LED 11B (that emits blue light) one for each color. A plurality of such groups forms an LED array. The number and arranging manner of the LEDs 11 can be arbitrarily determined. Here, for convenience of illustration, four groups of LEDs 11 are disposed in a square grid of 2 rows and 2 columns at constant intervals, and each group includes three LEDs 11R, 11G and 11B arranged to form a triangle.

The anode driver IC 31 and the cathode driver IC 32 for driving the LED 11 are disposed on the first surface of the substrate 10. As shown in FIG. 16, the anode wirings 12 (whose ends are connected to the anode driver IC 31) are connected to the anode electrodes 14 of the LEDs 11 of the closest group to the anode driver IC 31. The cathode wirings 13 (whose ends are connected to the cathode driver IC 32) are connected to the cathode electrodes 15 of the LEDs 11 of the closest group to the cathode driver IC 32. The anode electrode 14 and the cathode electrode 15 of the LEDs 11R of the adjacent groups are connected by the interconnection wirings 21. The anode electrode 14 and the cathode electrode 15 of the LEDs 11G of the adjacent groups are connected by the interconnection wirings 21. The anode electrode 14 and the cathode electrode 15 of the LEDs 11B of the adjacent groups are connected by the interconnection wirings 21.

In other words, the LEDs that emit lights of the same color are connected in series via the interconnection wirings 21. The anode electrode 14 and the cathode electrode 15 of the endmost LEDs 11 (i.e., the LED 11 closest to the anode driver IC 31 and the LED 11 closest to the cathode driver IC 32) are connected to the anode driver IC 31 and the cathode driver IC 32 via the anode wirings 12 and the cathode wirings 13.

As shown in FIGS. 14 and 15, a plurality of protrusions 52 are formed on the first surface (i.e., the upper surface in FIG. 14) of the substrate 50. The protrusions 52 have inclined surfaces 52a which are inclined with respect to flat portions 53 of the first surface of the substrate 50. A reflection film 51 is fixed to the first surface and the protrusions 52 of the substrate 50 so as to entirely cover the first surface of the substrate 50 including the surface of the protrusions 52. In this regard, in FIG. 15, the inclined surfaces 52a of the protrusions 52 are omitted (i.e., the protrusions 52 are illustrated as upright walls). The first surface of the substrate 10 and the first surface of the substrate 50 face each other. Each protrusion 52 of the substrate 50 is disposed facing the vicinity of a center between adjacent LEDs 11 on the first surface of the substrate 10. The tips (apexes) of the protrusions 52 contact the first surface of the substrate 10.

The LEDs 11 disposed on the first surface of the substrate 10 face the reflection film 51 formed on flat portions 53 of the first surface of the substrate 50.

With such a configuration, the light diffusion plate 30 and the reflection film 51 are disposed on both sides with respect to the LEDs 11. Therefore, the lights emitted by the LEDs 11 toward the substrate 10 are incident on the light diffusion plate 30 as shown by arrows A in FIG. 14, and the lights emitted by the LEDs 11 toward the substrate 50 are reflected by the reflection film 51 on the substrate 50, and are incident on the light diffusion plate 30 as shown by arrows C in FIG. 14. Further, the lights emitted from the end surfaces of the LEDs 11 are reflected by the reflection film 51 on the inclined surfaces 52a of the protrusions 52 according to inclination angles of the inclined surfaces 52a as shown by arrows D in FIG. 14, and are incident on the light diffusion plate 30.

Therefore, when the LEDs 11 emit lights from both surfaces and the end surfaces thereof, the light diffusion plate 30 facing the LEDs 11 and the reflection film 51 are irradiated with the lights from the LEDs 11 and the reflected lights from the reflection film 51 (including the reflection film 51 on the inclined surfaces 52a). The light diffusion plate 30 uniformly diffuses the incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by the arrows B.

Next, a process for providing the LED 11 will be described.

Figure 17:
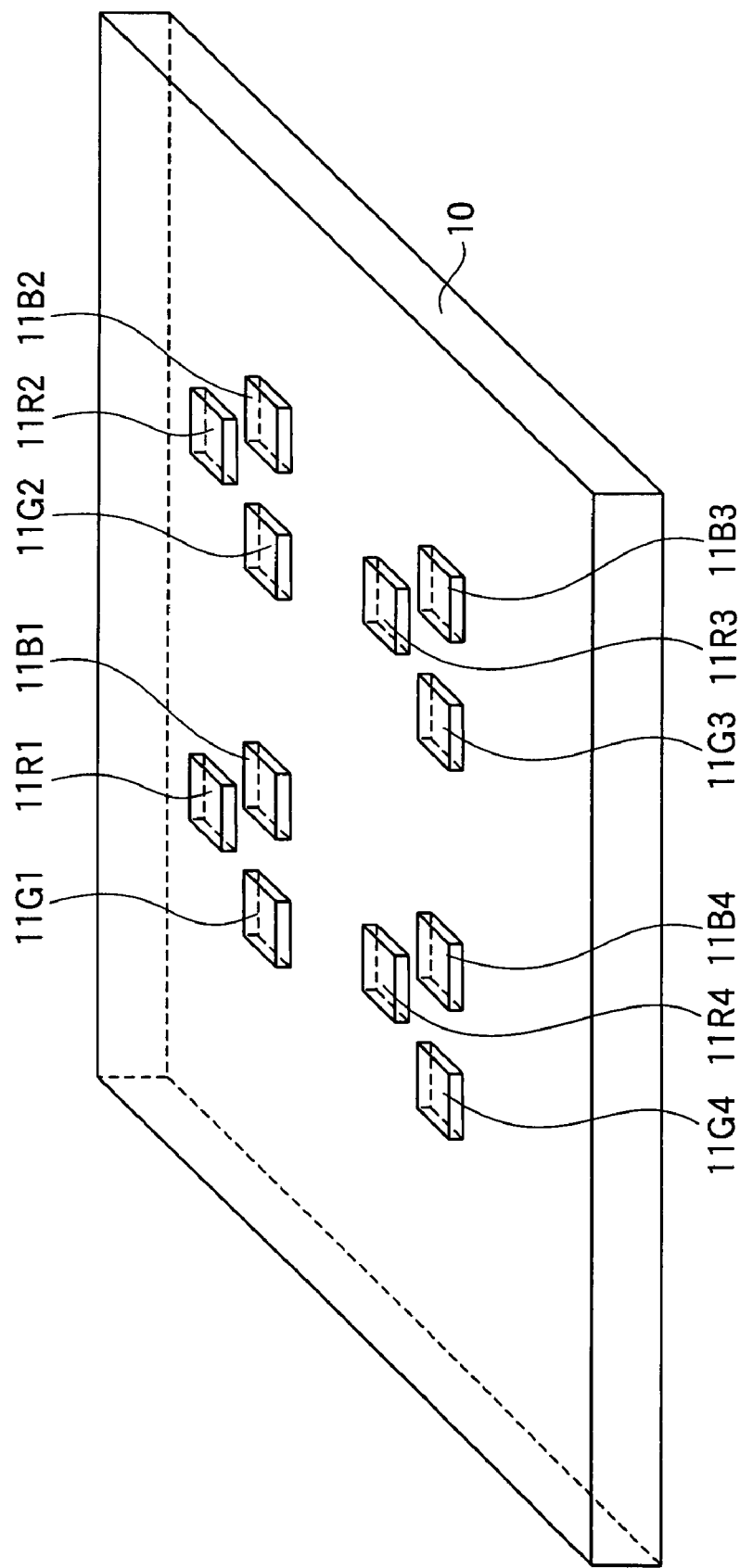
FIG. 17 is a schematic view for illustrating a process for fixing the LED thin-film to the first substrate according to the third embodiment of the present invention.

FIG. 17 is a schematic view for illustrating a process for fixing the LED thin-film to the substrate 10 according to the third embodiment of the present invention.

The LEDs 11 are formed in a similar manner as described with reference to FIG. 10 in the first embodiment. In FIG. 10, the LED thin-film 18 is formed on the base material 16 via the sacrificial layer 17. In the case where each LED 11 has a square shape having each side of 2 mm in length, the LED thin-film 18 for forming the LED 11 has a square shape having each side longer than or equal to 2 mm. In other words, each LED thin-film 18 is formed to have shape and size substantially the same as the LED 11. The respective LED thin-films 18 are fixed to the first surface of the substrate 10 in a similar manner as described with reference to FIGS. 7 through 9. With such processes, the LED array including four group of LEDs arranged in a square grid (and each group includes three LEDs arranged to form a triangle) can be obtained as shown in FIG. 17.

To be more specific, as shown in FIG. 17, the LEDs 11R1, 11G1 and 11B1 are arranged to form a triangle and constitute a first group. The LEDs 11R2, 11G2 and 11B2 are arranged to form a triangle and constitute a second group. The LEDs 11R3, 11G3 and 11B3 are arranged to form a triangle and constitute a third group. The LEDs 11R4, 11G4 and 11B4 are arranged to form a triangle and constitute a fourth group. The first, second, third and fourth groups are arranged in a square grid.

The other configurations of the LED backlight device 100 are the same as those of the first embodiment, and descriptions thereof are omitted.

Next, the operation of the LED backlight device 100 of the third embodiment will be described.

A lighting signal is sent from a superior device (such as a not shown personal computer) and is inputted to the anode driver IC 31. Upon receiving the lighting signal, the amplifier circuit of the anode driver IC 31 applies constant currents to the anode electrodes 14 of the LEDs 11 of the closest group to the anode drier IC 31 via the anode wirings 12.

When the lighting signal is inputted to the cathode driver IC 32, the cathode driver IC 32 operates to allow the currents to flow therein from the cathode electrodes 15 of the LEDs 11 of the closest group to the cathode driver IC 32 through the cathode wirings 13 connected to the cathode driver IC 32 via the switching circuit having a large capacity.

The LEDs 11 that emit the light of the same colors are connected in series via the interconnection wirings 21. With this, the LEDs 11 are applied with currents via the interconnection wirings 21, and emit lights of red, green and blue.

As described above, the light diffusion plate 30 and the reflection film 51 are disposed on both sides with respect to the LEDs 11 via the substrates 10 and 50. Therefore, when the LEDs 11 (LEDs 11R, 11B and 11C) emit lights, the lights emitted by the LEDs 11 toward the substrate 10 are directly incident on the light diffusion plate 30 as shown by the arrows A, and the lights emitted by the LEDs 11 toward the substrate 50 are reflected by the reflection film 51 and are incident on the light diffusion plate 30 as shown by the arrows C. Furthermore, the lights emitted from the end surfaces of the LEDs 11 are reflected by the reflection film 51 on the inclined surfaces 52a of the protrusions 52 according to inclination angles of the inclined surfaces 52a as shown by arrows D in FIG. 14.

Therefore, when the LEDs 11 emit lights from both surfaces and the end surfaces thereof, the light diffusion plate 30 facing the LEDs 11 and the reflection film 51 are irradiated with the lights from the LEDs 11 and the reflected lights from the reflection film 51 (including the reflection film 51 on the inclined surfaces 52a). The light diffusion plate 30 uniformly diffuses the incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by the arrows B.

In this regard, the substrates 10 and 50 can be fixed to each other by filling a material such as silicone-based resin having high optical transparency into between the first surface of the substrate 10 and the first surface of the substrate 50, defoaming the material, and drying the material.

As described above, in the third embodiment, the light diffusing plate 30 and the reflection film 51 are disposed on both sides of the LEDs 11. The protrusions 52 have inclined surfaces 52a on which the reflection film 51 is fixed, and contact the portions on the first surface of the substrate 10 between the groups of the LEDs 11. Therefore, the lights emitted from the side end surfaces of the LEDs 11 are reflected by the protrusions 52 and are incident on the light diffusion plate 30, as well as the lights emitted by both surfaces (i.e., upper and lower surfaces in FIG. 14) of the LEDs 11. As a result, a thin and large LED backlight device 100 with low energy consumption can be obtained.

Fourth Embodiment

Next, the fourth embodiment of the present invention will be described. Components of the fourth embodiment that are the same as those of the first to third embodiment are assigned the same reference numerals, and descriptions thereof are omitted. Further, descriptions of the operations and advantages that are same as those of the first to third embodiment are omitted.

Figure 18:
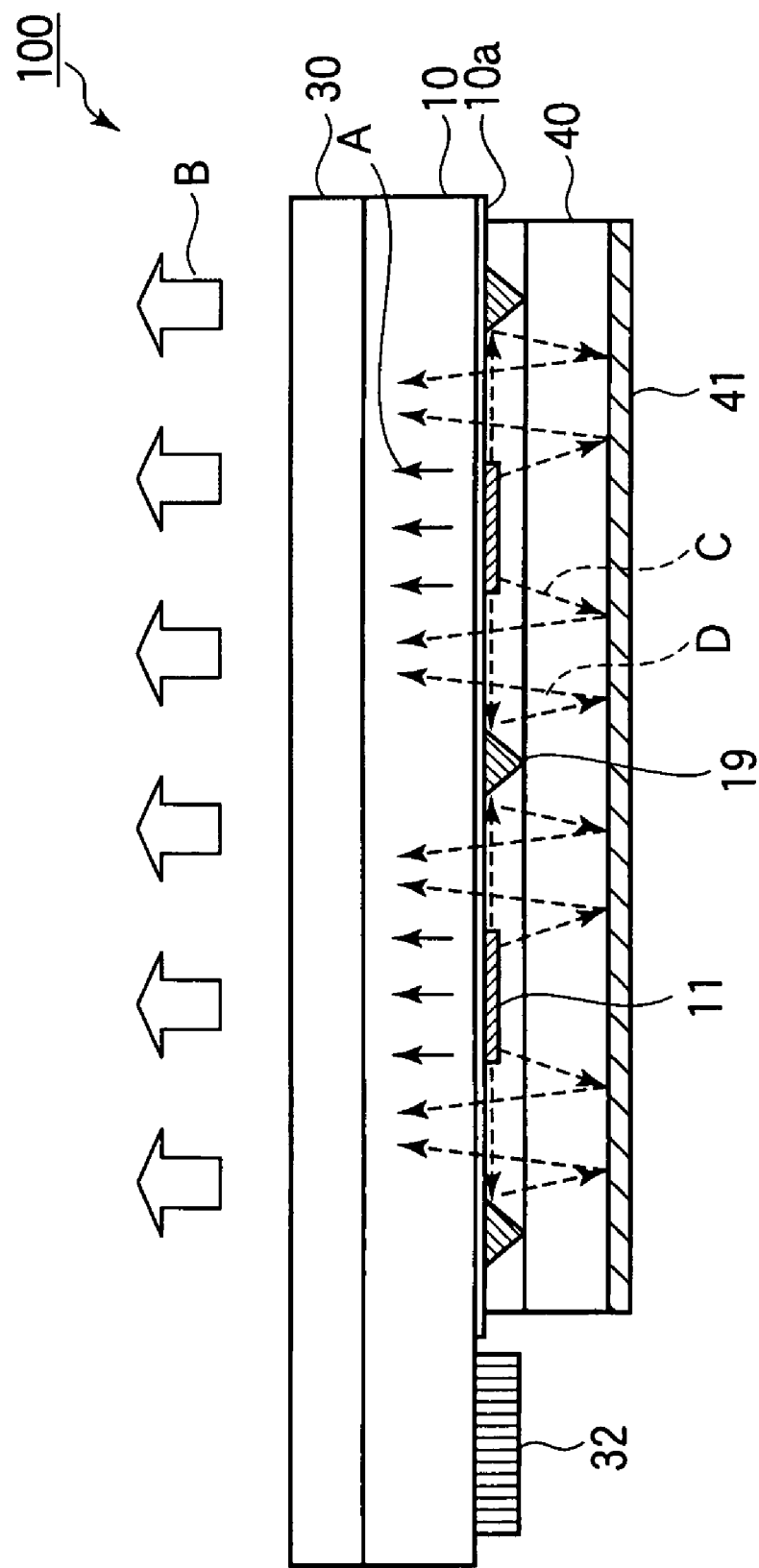
FIG. 18 is a side sectional view showing an LED thin-film according to the fourth embodiment of the present invention.
Figure 19:
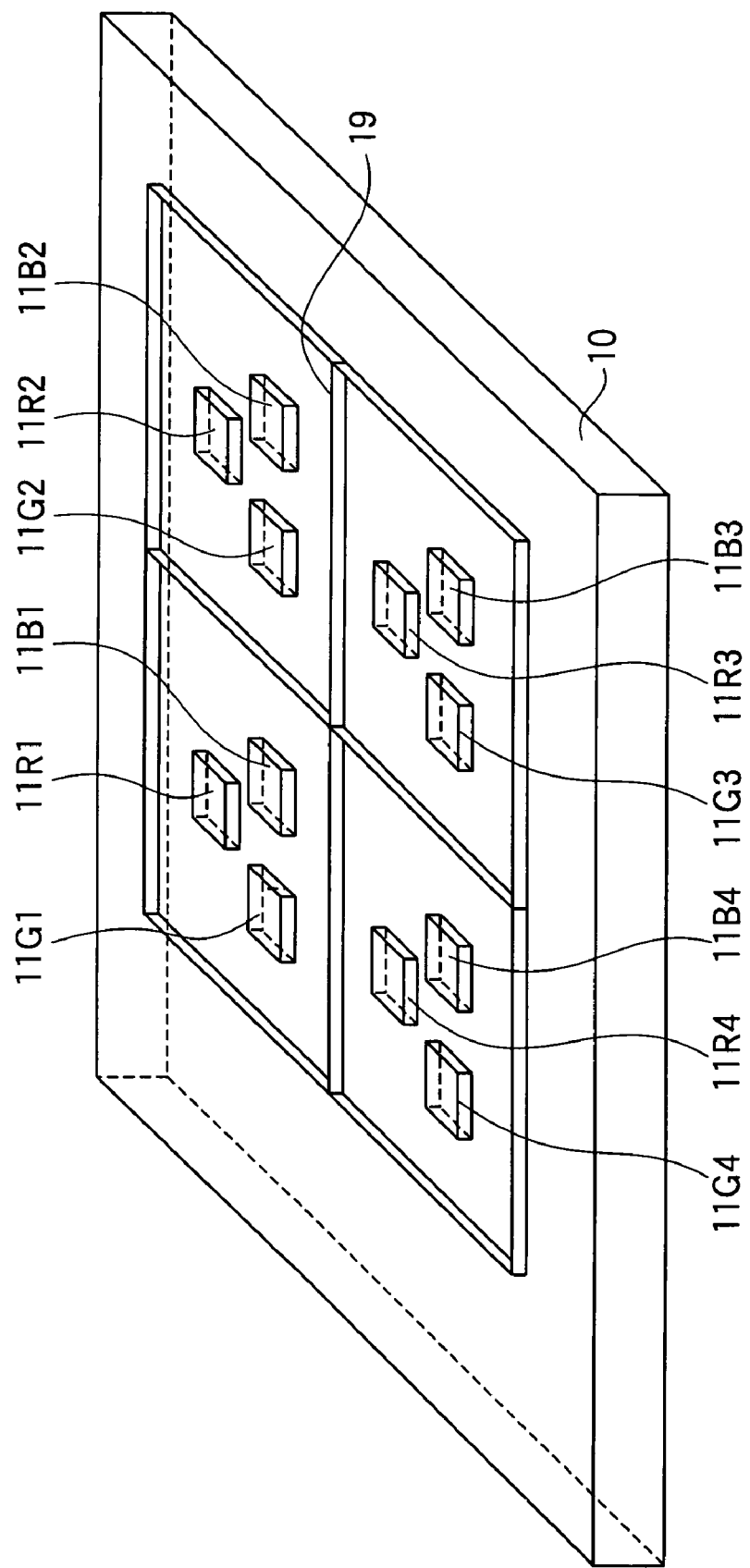
FIG. 19 is a perspective view showing an arrangement on a first surface of a first substrate of the LED backlight device according to the fourth embodiment of the present invention.

FIG. 18 is a side sectional view showing the LED backlight device according to the fourth embodiment of the present invention. FIG. 19 is a perspective view showing an arrangement on a first surface of a first substrate of the LED backlight device according to the fourth embodiment of the present invention.

In the fourth embodiment, the LED backlight device 100 includes the substrate 10 (i.e., a first substrate) in the form of a flat plate and the substrate 40 (i.e., a second substrate) in the form of a flat plate, and the light diffusion plate 30. The first surface (i.e., a lower surface) of the substrate 10 faces the second surface (i.e., an upper surface in FIG. 18) of the substrate 40. The light diffusion plate 30 is disposed facing the second surface (i.e., an upper surface in FIG. 18) of the substrate 10.

A plurality of LEDs 11 are arranged on the first surface of the substrate 10. A reflection film 41 is formed so as to entirely cover the first surface (i.e., a lower surface in FIG. 18) of the substrate 40. Protrusions 19 are formed on the first surface of the substrate 10. The protrusions 19 have inclined surfaces 19a and protrude toward the substrate 40. The protrusions 19 are located at positions between the groups of LEDs 11.

To be more specific, as shown in FIG. 19, the protrusions 19 are located at position between the first group of the LEDs 11R1, 11G1 and 11B1, the second group of the LEDs 11R2, 11G2 and 11B2, the third group of the LED 11R3, 11G3 and 11B3 and the fourth group of the LEDs 11R4, 11G4 and 11B4. In this regard, the inclined surfaces 19a of the protrusions 19 are omitted in FIG. 19 (i.e., the protrusions 19 are illustrated as upright walls).

As shown in FIG. 18, in a state where the substrate 10 faces the substrate 40, the tips of the protrusions 19 contact the second surface of the substrate 40. The protrusions 19 are formed of material that reflects light.

The LEDs 11 on the first surface of the substrate 10 and the reflection film 41 on the first surface of the substrate 40 are disposed on positions corresponding to each other.

With this, the light diffusion plate 30 and the reflection film 41 are disposed on both sides with respect to the LEDs 11. The lights emitted by the respective LEDs 11 toward the substrate 10 are emitted on the light diffusion plate 30 as shown by arrows A. The lights emitted by the LEDs 11 toward the substrate 40 are reflected by the reflection film 41 as shown by arrows C, and are incident on the light diffusion plate 30. Further, the lights emitted from the end surfaces of the LEDs 11 are reflected by the inclined surfaces 19a of the protrusions 19 according to inclination angles of the inclined surfaces 19a, and are reflected by the reflection film 41 as shown by arrows D.

The other configurations of the LED backlight device 100 are the same as those of the first embodiment, and descriptions thereof are omitted.

Next, the operation of the LED backlight device 100 of the fourth embodiment will be described.

A lighting signal is sent from a superior device (such as a not shown personal computer) and is inputted to the anode driver IC 31. Upon receiving the lighting signal, the amplifier circuit of the anode driver IC 31 applies constant currents to the anode electrodes 14 of the LEDs 11 of the closest group to the anode drier IC 31 via the anode wirings 12.

When the lighting signal is inputted to the cathode driver IC 32, the cathode driver IC 32 operates to allow the currents to flow therein from the cathode electrodes 15 of the LEDs 11 of the closest group to the cathode driver IC 32 through the cathode wirings 13 connected to the cathode driver IC 32 via the switching circuit having a large capacity.

The LEDs 11 that emit the lights of the same color are connected in series via the interconnection wirings 21 (see FIG. 16). With this, the LEDs 11 are applied with currents via the interconnection wirings 21, and emit lights of red, green and blue.

As described above, the light diffusion plate 30 and the reflection film 41 are disposed on both sides with respect to the LEDs 11. Therefore, when the LEDs 11 emit lights, the lights emitted by the LEDs 11 toward the substrate 10 are directly incident on the light diffusion plate 30 as shown by the arrows A, and the lights emitted by the LEDs 11 toward the substrate 40 are reflected by the reflection film 41 and are incident on the light diffusion plate 30 as shown by the arrows C. Further, the lights emitted from the end surfaces of the LEDs 11 are reflected by the inclined surfaces 19a of the protrusions 19 according to inclination angles of the inclined surfaces 19a, are reflected by the reflection film 41 as shown by arrows D, and are incident on the light diffusion plate 30.

Therefore, when the LEDs 11 emit lights from both surfaces and the end surfaces thereof, the light diffusion plate 30 (disposed facing the LEDs 11 and the reflection film 41) is irradiated with the lights from the LEDs 11 and the reflected lights from the reflection film 41 and the reflected lights from the inclined surfaces 19a of the protrusions 19. The light diffusion plate 30 uniformly diffuses the incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by the arrows B.

In this regard, the substrates 10 and 40 can be fixed to each other (so that the tips of the protrusions 19 contact the second surface of the substrate 40) by filling a material such as silicone-based resin having high optical transparency into between the first surface of the substrates 10 and the second surface of the substrate 40, defoaming the material, and drying the material.

As described above, in the fourth embodiment, the light diffusing plate 30 and the reflection film 41 are disposed on both sides with respect to the LEDs 11. Further, the protrusions 19 having inclined surfaces 19a are disposed in the vicinities of centers between adjacent groups of the LEDs 11, and protrude toward the substrate 40. Therefore, the lights emitted from the end surfaces of the LEDs 11 are reflected by the protrusions 19 and are incident on the light diffusion plate 30, as well as the lights emitted from both surfaces (i.e., upper and lower surfaces in FIG. 18) of the LEDs 11. As a result, a thin, large and high-intensity LED backlight device 100 with low energy consumption can be obtained.

Fifth Embodiment

Next, the fifth embodiment of the present invention will be described. Components of the fifth embodiment that are the same as those of the first to fourth embodiment are assigned the same reference numerals, and descriptions thereof are omitted. Further, descriptions of the operations and advantages that are same as those of the first to fourth embodiment are omitted.

Figure 20:
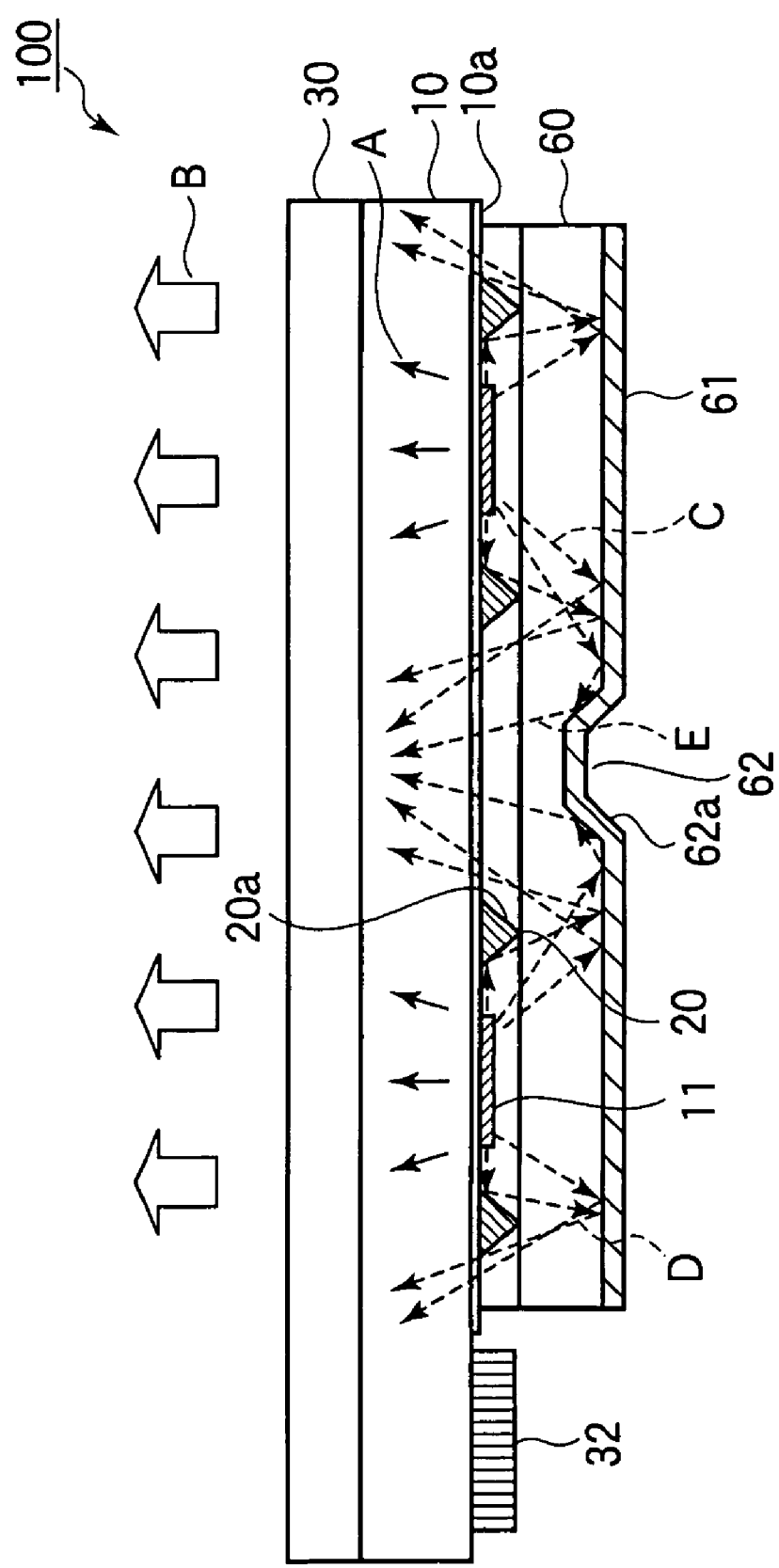
FIG. 20 is a side sectional view showing an LED backlight device according to the fifth embodiment of the present invention.
Figure 21:
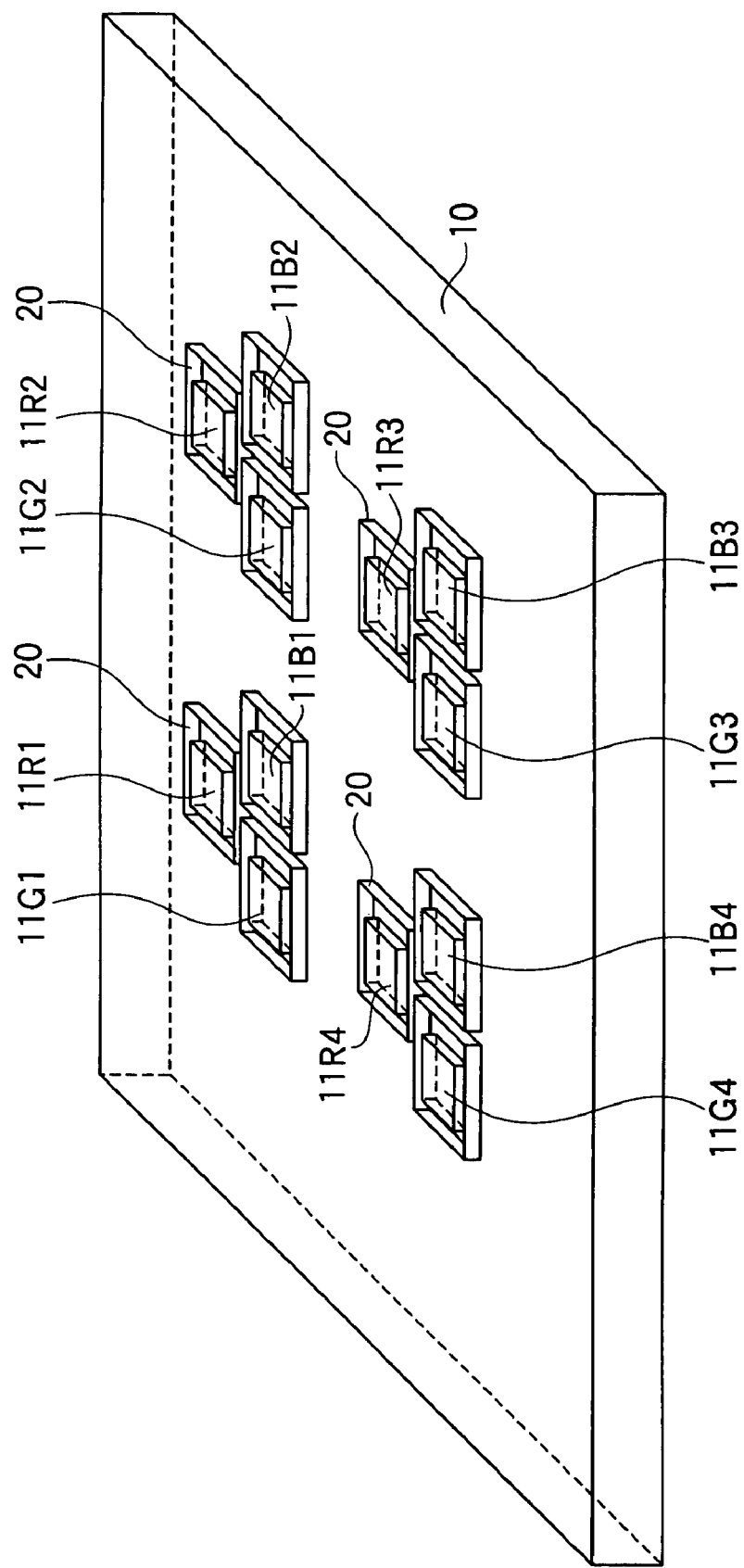
FIG. 21 is a perspective view showing an arrangement on a first surface of a first substrate of the LED backlight device according to the fifth embodiment of the present invention.
Figure 22:
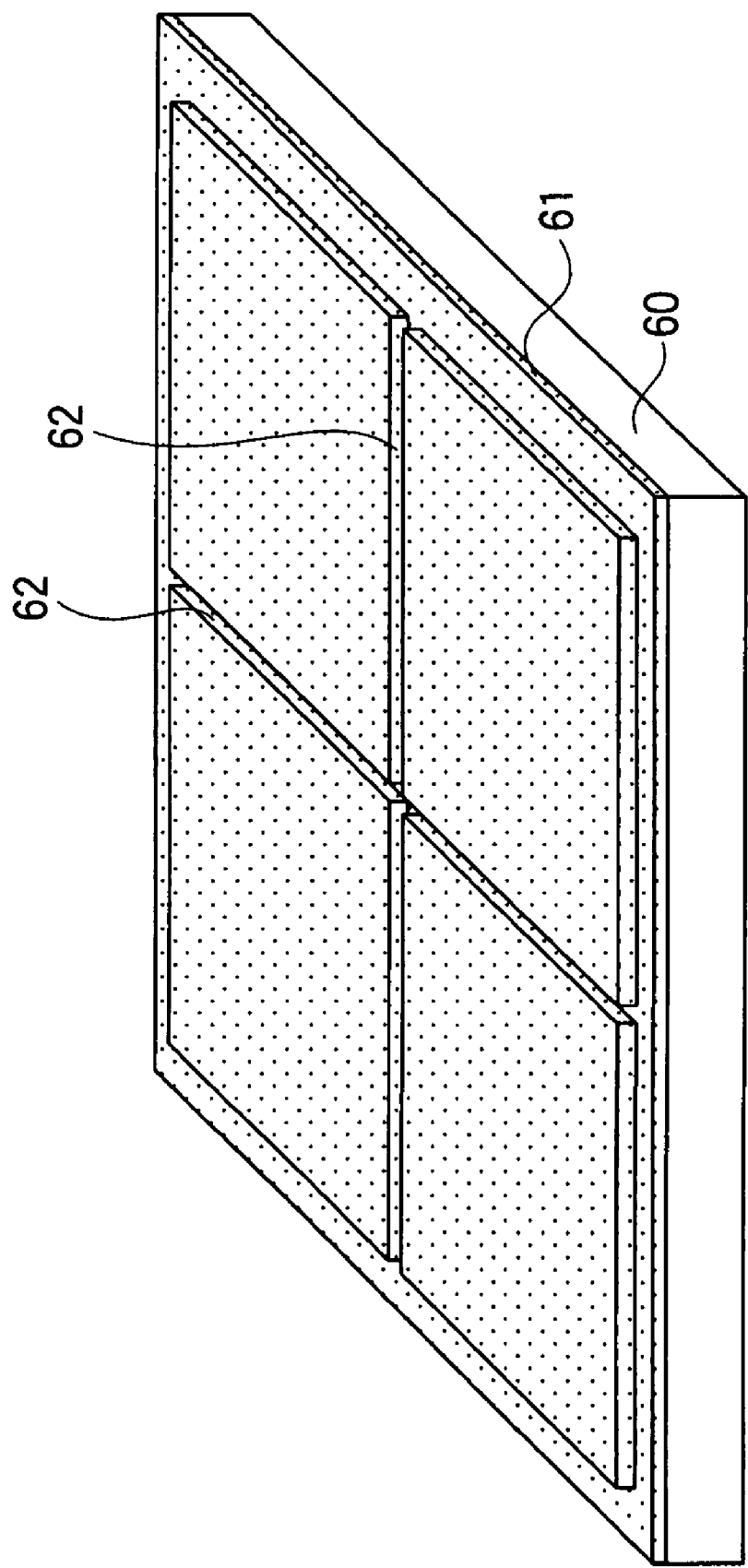
FIG. 22 is a perspective view showing a second substrate of the LED backlight device according to the fifth embodiment of the present invention, as seen from a first surface side thereof.

FIG. 20 is a side sectional view showing the LED backlight device according to the fifth embodiment of the present invention. FIG. 21 is a perspective view showing an arrangement on a first surface of a first substrate of the LED backlight device. FIG. 22 is a perspective view showing the second substrate of the LED backlight device as seen from the first surface side thereof.

In the fifth embodiment, the LED backlight device 100 includes the substrate 10 (i.e., a first substrate) in the form of a flat plate and a substrate 60 (i.e., a second substrate) in the form of a flat plate, and the light diffusion plate 30. The first surface (i.e., a lower surface in FIG. 20) of the substrate 10 faces the second surface (i.e., an upper surface in FIG. 20) of the substrate 60. The light diffusion plate 30 is disposed facing the second surface (i.e., an upper surface in FIG. 20) of the substrate 10.

A plurality of LEDs 11 are arranged on the first surface of the substrate 10. A reflection film 61 is formed so as to entirely cover the first surface (i.e., a lower surface in FIG. 20) of the substrate 60. Protrusions 20 are formed on the first surface of the substrate 10. The protrusions 20 have inclined surfaces 20a and protrude toward the substrate 60.

Each protrusion 20 is formed in the vicinity of the individual LED 11 so as to surround the individual LED 11 as shown in FIG. 21.

To be more specific, as shown in FIG. 21, the LEDs 11R1, 11G1 and 11B1 are respectively surrounded by the protrusion 20 and constitute a first group. The LEDs 11R2, 11G2 and 11B2 are respectively surrounded by the protrusion 20 and constitute a second group. The LEDs 11R3, 11G3 and 11B3 are respectively surrounded by the protrusion 20 and constitute a third group. The LED 11R4, 11G4 and 11B4 are respectively surrounded by the protrusion 20 and constitute a fourth group. The first, second, third and fourth groups constitute an array.

The number and arranging manner of the LEDs 11 can be arbitrarily determined. Here, for convenience of illustration, four groups of LEDs 11 are arranged in a square grid of 2 rows and 2 columns at constant intervals, and each group includes the LED 11R, the LED 11G and the LED 11B one for each color. In this regard, the inclined surfaces 20a of the protrusions 20 are omitted in FIG. 21 (i.e., the protrusions 20 are illustrated as upright walls).

Concaves 62 are formed on the first surface (i.e., the lower surface in FIG. 20) of the substrate 60. The concaves 62 are formed into the substrate 60 toward to the second surface (i.e., the upper surface in FIG. 20), and have inclined surfaces 62a. The reflection film 61 is formed so as to cover the first surface of the substrate 10 including the surfaces of the concaves 62 as shown in FIG. 22. In this regard, the inclined surfaces of the concaves 62 are omitted in FIG. 22 (i.e., the concaves 62 are illustrated to have upright walls).

As shown in FIG. 20, the first surface of the substrate 10 faces the second surface of the substrate 60. The concaves 62 are located so as to face the vicinities of centers between adjacent groups of the LEDs 11 on the first surface of the substrate 10. The tips of the protrusions 20 contact the second surface of the substrate 60. The protrusions 20 are formed of a material that reflects light.

The LEDs 11 on the first surface of the substrate 10 and the reflection film 61 on the first surface of the substrate 60 are disposed on positions corresponding to each other.

As described above, the light diffusion plate 30 and the reflection film 61 are disposed on both sides with respect to the LEDs 11. Therefore, the lights emitted by the LEDs 11 toward the substrate 10 are directly incident on the light diffusion plate 30 as shown by the arrows A, and the lights emitted by the LEDs 11 toward the substrate 60 are reflected by the reflection film 61 and are incident on the light diffusion plate 30 as shown by the arrows C. Further, the lights emitted from the end surfaces of the LEDs 11 are reflected by the inclined surfaces 20a of the protrusions 20 according to inclination angles of the inclined surfaces 20a as shown by arrows D, and are incident on the light diffusion plate 30. Further, a part of the lights emitted by the LEDs 11 toward the substrate 60 is reflected by the reflection film 61 on the inclined surfaces 62a of the concaves 62 according to inclination angles of the inclined surfaces 62a, and is incident on the light diffusion plate 30.

In this regard, the protrusions 20 are not necessarily formed to individually surround the LEDs 11 as shown in FIG. 21, but can be suitably modified. Here, a modification of the LED backlight device according to the fifth embodiment will be described.

Figure 23:
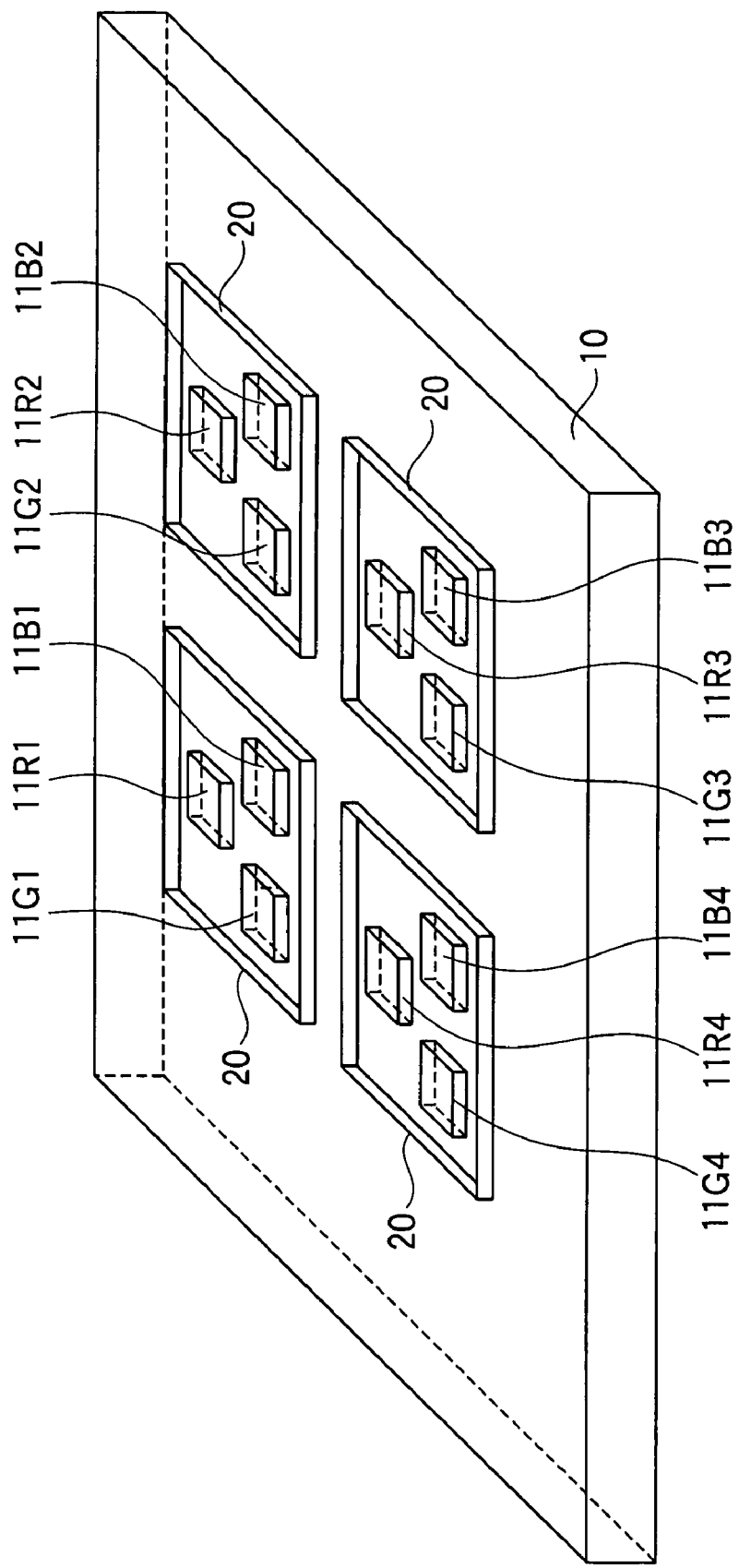
FIG. 23 is a perspective view showing a modification of an arrangement on the first surface of the first substrate of the LED backlight device according to the fifth embodiment of the present invention.

FIG. 23 is a perspective view showing a modification of the LED backlight device 100 according to the fifth embodiment, as seen from the first surface side.

In the modification shown in FIG. 23, each protrusion 23 is formed to surround individual group of the LEDs 11. Each group includes the LED 11R, the LED 11G and the LED 11B one for each color. The first surface of the substrate 10 and the second surface of the substrate 60 (see FIG. 20) face each other. The concaves 62 (see FIG. 20) are disposed facing the vicinities of centers of the adjacent groups of the LEDs 11 on the first surface of the substrate 10. The tips of the protrusions 20 contact the second surface of the substrate 60.

The other configurations of the LED backlight device 100 are the same as those shown in FIGS. 20 through 22, and descriptions thereof are omitted.

Next, the operation of the LED backlight device 100 of the fifth embodiment will be described.

A lighting signal is sent from a superior device (such as a not shown personal computer) and is inputted to the anode driver IC 31. Upon receiving the lighting signal, the amplifier circuit of the anode driver IC 31 applies constant currents to the anode electrodes 14 of the LEDs 11 of the closest group to the anode drier IC 31 via the anode wirings 12.

When the lighting signal is inputted to the cathode driver IC 32, the cathode driver IC 32 operates to allow the currents to flow therein from the cathode electrodes 15 of the LEDs 11 of the closest group to the cathode driver IC 32 through the cathode wirings 13 connected to the cathode driver IC 32 via the switching circuit having a large capacity.

The LEDs 11 that emit the lights of the same color are connected in series via the interconnection wirings 21 (see FIG. 16). With this, the LEDs 11 are applied with current via the interconnection wirings 21, and emit lights of red, green and blue.

As described above, the light diffusion plate 30 and the reflection film 61 are disposed on both sides with respect to the LEDs 11. Therefore, when the LEDs 11 emit lights, the lights emitted by the LEDs 11 toward the substrate 10 are directly incident on the light diffusion plate 30 as shown by the arrows A, and the lights emitted by the LEDs 11 toward the substrate 60 are reflected by the reflection film 61 and are incident on the light diffusion plate 30 as shown by the arrows C. Further, the lights emitted at the end surfaces of the LEDs 11 are reflected by the inclined surfaces 20a of the protrusions 20 according to inclined angles of the inclined surfaces 20a as shown by arrows D, and are incident on the light diffusion plate 30. Further, a part of the lights emitted by the LEDs 11 toward the substrate 60 is reflected by the reflection film 61 on the inclined surfaces 62a of the concaves 62 according to inclination angles of the inclined surfaces 62a, and are incident on the light diffusion plate 30.

Therefore, when the LEDs 11 emit lights from both surfaces and the end surfaces thereof, the light diffusion plate 30 (disposed facing the LEDs 11 and the reflection film 61) is irradiated with the lights from the LEDs 11 and the reflected lights from the reflection film 61, the inclined surfaces 20a of the protrusions 20 and the concaves 62. The light diffusion plate 30 uniformly diffuses the incident lights, so as to mix the red light (having the wavelengths in a range from 620 to 720 nm), the green light (having the wavelengths in a range from 500 to 580 nm) and the blue light (having the wavelength in a range from 450 to 500 nm), and emits white light as shown by the arrows B.

In this regard, the first surface of the substrate 10 and the second surface of the substrate 60 can be fixed to each other (so that the tips of the protrusions 20 contact the second surface of the substrate 60) by filling a material such as silicone-based resin having high optical transparency into between the first surface of the substrates 10 and the second surface of the substrate 60, defoaming the material, and drying the material.

As described above, in the fifth embodiment, the light diffusing plate 30 and the reflection film 61 are disposed on both sides with respect to the LEDs 11. Further, the protrusions 20 having inclined surfaces 20a are disposed so as to surround the LEDs 11 and protrude toward the substrate 60. Furthermore, the concaves 62 are formed on the substrate 60 to which the reflection film 61 is fixed. Therefore, the lights emitted from the end surfaces of the LEDs 11 are reflected by the protrusions 20 and a part of the lights is reflected by the reflection film 61 on the concaves 62. These reflected lights are incident on the light diffusion plate 30, as well as the lights emitted by both surfaces of the LEDs 11. As a result, a thin, large and high-intensity LED backlight device 100 with low energy consumption can be provided.

While the preferred embodiments of the present invention have been illustrated in detail, it should be apparent that modifications and improvements may be made to the invention without departing from the spirit and scope of the invention as described in the following claims.

What is claimed is:

1. An LED backlight device comprising:
   a first substrate having optical transparency, and having a first surface and a second surface opposite to each other;
   an LED thin-film fixed to said first surface of said first substrate, said LED thin-film being formed of epitaxially grown inorganic material layers as a P-N junction device;
   an anode electrode and a cathode electrode formed on said LED thin-film;
   an anode driver IC and a cathode driver IC for driving said LED thin-film to emit light;
   an anode wiring provided on said first surface of said first substrate to electrically connect said anode driver IC and said anode electrode of said LED thin-film,
   a cathode wiring provided on said first surface of said first substrate to electrically connect said cathode driver IC and said cathode electrode of said LED thin-film;
   a second substrate having optical transparency, and having a first surface and a second surface opposite to each other, said second surface of said second substrate facing said first surface of said first substrate;
   a reflection film provided on said first surface of said second substrate, and
   a light diffusion plate provided so as to face said second surface of said first substrate, and having a function to diffuse incident light.

2. The LED backlight device according to claim 1, wherein said LED thin-film is fixed to said first surface of said first substrate by means of intermolecular force, and
   wherein said LED thin-film includes an LED thin-film that emits red light whose wavelength is in a range from 620 to 710 nm, an LED thin-film that emits green light whose wavelength is in a range from 500 to 580 nm, and an LED thin-film that emits blue light whose wavelength is in a range from 450 to 500 nm.

3. The LED backlight device according to claim 1, wherein said first surface of said first substrate is formed of a planarized insulation film.

4. The LED backlight device according to claim 1, wherein said LED thin-film is obtained by epitaxially growing inorganic material layers as a P-N junction device on a sacrificial layer formed on a base material different from said first substrate, separating said inorganic material layers from said base material by removing said sacrificial material layers using etching, fixing said inorganic material layers to said first surface of said first substrate by means of intermolecular force, and etching said inorganic material layers.

5. The LED backlight device according to claim 1, wherein a plurality of said LED thin-films are arranged in rows and columns at intervals on said first surface of said first substrate.

6. The LED backlight device according to claim 1, wherein a plurality of said LED thin-films are arranged in rows, said anode wiring connects said anode driver IC and said anode electrode of an endmost LED thin-film of each row, said cathode wiring connects said cathode driver IC and said cathode electrode of another endmost LED thin-film of each row, and an interconnection wiring is provided for connecting LED thin-films of each row.

7. An LCD device comprising:
said LED backlight device according to claim 1, and
an LCD panel provided so as to face said LED backlight device.

8. An LED backlight device comprising:
a first substrate having optical transparency and having a first surface and a second surface opposite to each other;
an LED thin-film fixed to said first surface of said first substrate, said LED thin-film being formed of epitaxially grown inorganic material layers as a P-N junction device;
an anode electrode and a cathode electrode formed on said LED thin-film;
an anode driver IC and a cathode driver IC for driving said LED thin-film to emit light;
an anode wiring provided on said first surface of said first substrate to electrically connect said anode driver IC and said anode electrode of said LED thin-film,
a cathode wiring provided on said first surface of said first substrate to electrically connect said cathode driver IC and said cathode electrode of said LED thin-film;
a second substrate having a first surface and a second surface opposite to each other, said first surface of said second substrate facing said first surface of said first substrate;
a protrusion provided on said first surface of said second substrate, said protrusion having an inclined surface and facing a portion on said first surface of said first substrate apart from said LED thin-film by a predetermined distance;
a reflection film provided so as to cover said first surface of said second substrate, and
a light diffusion plate provided so as to face said second surface of said first substrate, and having a function to diffuse incident light.

9. The LED backlight device according to claim 8, wherein said LED thin-film is fixed to said first surface of said first substrate by means of intermolecular force, and
wherein said LED thin-film includes an LED thin-film that emits red light whose wavelength is in a range from 620 to 710 nm, an LED thin-film that emits green light whose wavelength is in a range from 500 to 580 nm, and an LED thin-film that emits blue light whose wavelength is in a range from 450 to 500 nm.

10. The LED backlight device according to claim 8, wherein said first surface of said first substrate is formed of a planarized insulation film.

11. The LED backlight device according to claim 8, wherein said LED thin-film is obtained by epitaxially growing inorganic material layers as a P-N junction device on a sacrificial layer formed on a base material different from said first substrate, separating said inorganic material layers from said base material by removing said sacrificial material layers using etching, fixing said inorganic material layers to said first surface of said first substrate by means of intermolecular force, and etching said inorganic material layers.

12. The LED backlight device according to claim 8, wherein a plurality of said LED thin-films are arranged in rows and columns at intervals on said first surface of said first substrate.

13. The LED backlight device according to claim 8, wherein said protrusion is disposed so as to surround a group of said LED thin-films including one LED thin-film that emits light whose wavelength is in a range from 620 to 710 nm, one LED thin-film that emits light whose wavelength is in a range from 500 to 580 nm, and one LED thin-film that emits light whose wavelength is in a range from 450 to 500 nm.

14. The LED backlight device according to claim 8, wherein a plurality of LED thin-films that emit lights of same colors are connected in series using interconnection wirings,
wherein said anode wiring connects said anode driver IC and said anode electrode of an endmost LED thin-film of said LED thin-films connected in series, said cathode wiring connects said cathode driver IC and said cathode electrode of another endmost LED thin-film of said LED thin-films connected in series.

15. An LCD device comprising:
said LED backlight device according to claim 8, and
an LCD panel provided so as to face said LED backlight device.

16. An LED backlight device comprising:
a first substrate having optical transparency, and having a first surface and a second surface opposite to each other;
an LED thin-film fixed to said first surface of said first substrate, said LED thin-film being formed of epitaxially grown inorganic material layers as a P-N junction device;
an anode electrode and a cathode electrode formed on said LED thin-film;
an anode driver IC and a cathode driver IC for driving said LED thin-film to emit light;
an anode wiring provided on said first surface of said first substrate to electrically connect said anode driver IC and said anode electrode of said LED thin-film,
a cathode wiring provided on said first surface of said first substrate to electrically connect said cathode driver IC and said cathode electrode of said LED thin-film;
a protrusion provided on said first surface of said first substrate, said protrusion having an inclined surface and being disposed apart from said LED thin-film by a predetermined distance;
a second substrate having optical transparency, and having a first surface and a second surface opposite to each other, said second surface of said second substrate facing said first surface of said first substrate;
a reflection film provided on said first surface of said second substrate, and
a light diffusion plate provided so as to face said second surface of said first substrate, and having a function to diffuse incident light.

17. The LED backlight device according to claim 16, wherein a concave having an inclined surface is formed on said first surface of said second substrate,
wherein said concave faces a portion on said firstsurface of said first substrate apart from said LED thin-film, and
wherein said reflection film covers said first surface of said first substrate including said concaves.

18. The LED backlight device according to claim 16, wherein said LED thin-film is fixed to said first surface of said first substrate by means of intermolecular force, and
wherein said LED thin-film includes an LED thin-film that emits red light whose wavelength is in a range from 620 to 710 nm, an LED thin-film that emits green light whose wavelength is in a range from 500 to 580 nm, and an LED thin-film that emits blue light whose wavelength is in a range from 450 to 500 nm.

19. The LED backlight device according to claim 16, wherein said first surface of said first substrate is formed of a planarized insulation film.

20. The LED backlight device according to claim 16, wherein said LED thin-film is obtained by epitaxially growing inorganic material layers as a P-N junction device on a sacrificial layer formed on a base material different from said first substrate, separating said inorganic material layers from said base material by removing said sacrificial material layers using etching, fixing said inorganic material layers to said first surface of said first substrate by means of intermolecular force, and etching said inorganic material layers.

21. The LED backlight device according to claim 16, wherein a plurality of said LED thin-films are arranged in rows and columns at intervals on said first surface of said first substrate.

22. The LED backlight device according to claim 16, wherein said protrusion is disposed so as to surround a group of said LED thin-films including one LED thin-film that emits light whose wavelength is in a range from 620 to 710 nm, one LED thin-film that emits light whose wavelength is in a range from 500 to 580 nm, and one LED thin-film that emits light whose wavelength is in a range from 450 to 500 nm.

23. The LED backlight device according to claim 16, wherein a plurality of LED thin-films that emit lights of same colors are connected in series using interconnection wirings,
wherein said anode wiring connects said anode driver IC and said anode electrode of an endmost LED thin-film of said LED thin-films connected in series, said cathode wiring connects said cathode driver IC and said cathode electrode of another endmost LED thin-film of said LED thin-films connected in series.

24. An LCD device comprising:
said LED backlight device according to claim 16, and
an LCD panel provided so as to face said LED backlight device.

* * * * *